United States Patent
Sato

(10) Patent No.: US 7,111,028 B2
(45) Date of Patent: Sep. 19, 2006

(54) DATA CONVERSION METHOD, A DATA CONVERSION CIRCUIT AND A DATA CONVERSION PROGRAM

(75) Inventor: Hisao Sato, Matsumoto (JP)

(73) Assignee: Seiko Epson Corporation, (JP)

( * ) Notice: Subject to any disclaimer, the term of this patent is extended or adjusted under 35 U.S.C. 154(b) by 707 days.

(21) Appl. No.: 10/291,173

(22) Filed: Nov. 8, 2002

(65) Prior Publication Data

US 2003/0131038 A1    Jul. 10, 2003

(30) Foreign Application Priority Data

Nov. 8, 2001  (JP) ............................. 2001-343581
Mar. 15, 2002 (JP) ............................. 2002-073072

(51) Int. Cl.
*G06F 15/00*  (2006.01)

(52) U.S. Cl. ..................................... 708/204

(58) Field of Classification Search ................ 708/605, 708/204
See application file for complete search history.

(56) References Cited

U.S. PATENT DOCUMENTS

| | | | |
|---|---|---|---|
| 4,282,578 A * | 8/1981 | Payne et al. ................. | 708/290 |
| 5,951,625 A * | 9/1999 | Duvanenko et al. ........ | 708/290 |
| 6,166,781 A * | 12/2000 | Kwak et al. ................. | 348/674 |
| 6,833,876 B1 * | 12/2004 | Pirjaberi ..................... | 348/674 |
| 6,931,426 B1 * | 8/2005 | Cho ............................ | 708/272 |

FOREIGN PATENT DOCUMENTS

| | | |
|---|---|---|
| JP | 04-023570 | 1/1992 |
| JP | 11-341307 | 12/1999 |
| JP | 2000-350054 | 12/2000 |

OTHER PUBLICATIONS

Communication from Japanese Patent Office re: related application. (Japanese Language).

\* cited by examiner

*Primary Examiner*—Tan V. Mai
*Assistant Examiner*—Chat C. Do
(74) *Attorney, Agent, or Firm*—Harness, Dickey & Pierce, P.L.C.

(57) ABSTRACT

A method of the data conversion, a data conversion circuit and a data conversion program are provided which make the memory capacity of the circuit for storing the converted data small and can make the error of the output data small. To comprise a priority encoder 11 outputting bit number of "1" located at the most significant bit in the input data as L data, a bit-extracting portion outputting (L-1) to (L-2) bits in the input data as N data and (L-3) to 0 bits as M data, a table address forming portion 13 outputting a first address obtained by combining the L data with the M data, a conversion-table storing portion 14 storing a conversion table where converted data corresponds to table addresses, a multiplexer 15 selecting 0 or converted data and a linear interpolation portion 20 processing interpolation based on the two converted data.

40 Claims, 24 Drawing Sheets

| INPUT DATA | L DATA | N DATA | TABLE ADDRESS | INCREMENT OF INPUT DATA | CONVERTED DATA |
|---|---|---|---|---|---|
| 16'h0000 | 4'h0 | 2'b00 | — | 16'h0001 | — |
| 16'h0001 | 4'h0 | 2'b00 | 6'b000000 | 16'h0001 | y0001 |
| 16'h0002 | 4'h1 | 2'b00 | 6'b000100 | 16'h0001 | y0002 |
| 16'h0003 | 4'h1 | 2'b10 | 6'b000110 | 16'h0001 | y0003 |
| 16'h0004 | 4'h2 | 2'b00 | 6'b001000 | 16'h0001 | y0004 |
| 16'h0005 | 4'h2 | 2'b01 | 6'b001001 | 16'h0001 | y0005 |
| 16'h0006 | 4'h2 | 2'b10 | 6'b001010 | 16'h0001 | y0006 |
| 16'h0007 | 4'h2 | 2'b11 | 6'b001011 | 16'h0001 | y0007 |
| 16'h0008 | 4'h3 | 2'b00 | 6'b001100 | 16'h0002 | y0008 |
| 16'h0009 | 4'h3 | 2'b00 | — | 16'h0002 | — |
| 16'h000a | 4'h3 | 2'b01 | 6'b001101 | 16'h0002 | y000a |
| 16'h000b | 4'h3 | 2'b01 | — | 16'h0002 | — |
| 16'h000c | 4'h3 | 2'b10 | 6'b001110 | 16'h0002 | y000c |
| 16'h000d | 4'h3 | 2'b10 | — | 16'h0002 | — |
| 16'h000e | 4'h3 | 2'b11 | 6'b001111 | 16'h0002 | y000e |
| 16'h000f | 4'h3 | 2'b11 | — | 16'h0002 | — |
| 16'h0010 | 4'h4 | 2'b00 | 6'b010000 | 16'h0004 | y0010 |
| .. | .. | .. | .. | .. | .. |
| 16'he000 | 4'hf | 2'b11 | 6'b111111 | 16'h1000 | ye000 |
| .. | .. | .. | .. | .. | .. |
| 16'hffff | 4'hf | 2'b11 | — | — | — |

FIG.2

| INPUT DATA | TABLE ADDRESS | CONVERTED DATA |
|---|---|---|
| 16'h0001 | 6'b000000 | $y_{0001}$ |
| 16'h0002 | 6'b000100 | $y_{0002}$ |
| 16'h0003 | 6'b000110 | $y_{0003}$ |
| 16'h0004 | 6'b001000 | $y_{0004}$ |
| 16'h0005 | 6'b001001 | $y_{0005}$ |
| 16'h0006 | 6'b001010 | $y_{0006}$ |
| 16'h0007 | 6'b001011 | $y_{0007}$ |
| 16'h0008 | 6'b001100 | $y_{0008}$ |
| 16'h000a | 6'b001101 | $y_{000a}$ |
| 16'h000c | 6'b001110 | $y_{000c}$ |
| 16'h000e | 6'b001111 | $y_{000e}$ |
| 16'h0010 | 6'b010000 | $y_{0010}$ |
| 16'h0014 | 6'b010001 | $y_{0014}$ |
| 16'h0018 | 6'b010010 | $y_{0018}$ |
| 16'h001c | 6'b010011 | $y_{001c}$ |
| 16'h0020 | 6'b010100 | $y_{0020}$ |
| 16'h0028 | 6'b010101 | $y_{0028}$ |
| 16'h0030 | 6'b010110 | $y_{0030}$ |
| 16'h0038 | 6'b010111 | $y_{0038}$ |
| 16'h0040 | 6'b011000 | $y_{0040}$ |
| 16'h0050 | 6'b011001 | $y_{0050}$ |
| 16'h0060 | 6'b011010 | $y_{0060}$ |
| 16'h0070 | 6'b011011 | $y_{0070}$ |
| 16'h0080 | 6'b011100 | $y_{0080}$ |
| 16'h00a0 | 6'b011101 | $y_{00a0}$ |
| 16'h00c0 | 6'b011110 | $y_{00c0}$ |
| 16'h00e0 | 6'b011111 | $y_{00e0}$ |

FIG.3

| INPUT DATA | TABLE ADDRESS | CONVERTED DATA |
|---|---|---|
| 16'h0100 | 6'b100000 | $y_{0100}$ |
| 16'h0140 | 6'b100001 | $y_{0140}$ |
| 16'h0180 | 6'b100010 | $y_{0180}$ |
| 16'h01c0 | 6'b100011 | $y_{01c0}$ |
| 16'h0200 | 6'b100100 | $y_{0200}$ |
| 16'h0280 | 6'b100101 | $y_{0280}$ |
| 16'h0300 | 6'b100110 | $y_{0300}$ |
| 16'h0380 | 6'b100111 | $y_{0380}$ |
| 16'h0400 | 6'b101000 | $y_{0400}$ |
| 16'h0500 | 6'b101001 | $y_{0500}$ |
| 16'h0600 | 6'b101010 | $y_{0600}$ |
| 16'h0700 | 6'b101011 | $y_{0700}$ |
| 16'h0800 | 6'b101100 | $y_{0800}$ |
| 16'h0a00 | 6'b101101 | $y_{0a00}$ |
| 16'h0c00 | 6'b101110 | $y_{0c00}$ |
| 16'h0e00 | 6'b101111 | $y_{0e00}$ |
| 16'h1000 | 6'b110000 | $y_{1000}$ |
| 16'h1400 | 6'b110001 | $y_{1400}$ |
| 16'h1800 | 6'b110010 | $y_{1800}$ |
| 16'h1c00 | 6'b110011 | $y_{1c00}$ |
| 16'h2000 | 6'b110100 | $y_{2000}$ |
| 16'h2800 | 6'b110101 | $y_{2800}$ |
| 16'h3000 | 6'b110110 | $y_{3000}$ |
| 16'h3800 | 6'b110111 | $y_{3800}$ |
| 16'h4000 | 6'b111000 | $y_{4000}$ |
| 16'h5000 | 6'b111001 | $y_{5000}$ |
| 16'h6000 | 6'b111010 | $y_{6000}$ |

FIG.4

| INPUT DATA | TABLE ADDRESS | CONVERTED DATA |
|---|---|---|
| 16'h7000 | 6'b111011 | $y_{7000}$ |
| 16'h8000 | 6'b111100 | $y_{8000}$ |
| 16'ha000 | 6'b111101 | $y_{a000}$ |
| 16'hc000 | 6'b111110 | $y_{c000}$ |
| 16'he000 | 6'b111111 | $y_{e000}$ |

$$y_c = y_a + \Delta y \cdot \Delta x \cdot \frac{1}{d}$$

| INPUT DATA | RANGE OF INPUT DATA | j DATA | dd DATA | span DATA | repi DATA | TABLE ADDRESS | CONVERTED DATA |
|---|---|---|---|---|---|---|---|
| ‥ | | ‥ | ‥ | ‥ | ‥ | ‥ | ‥ |
| 16'h1000 | ←  rep0 | 4'hc | 0 | 3 | 2'b00 | 6'b110000 | $y_{1000}$ |
| 16'h1100 | | 4'hc | 1 | 3 | 2'b00 | — | — |
| 16'h1200 | | 4'hc | 2 | 3 | 2'b00 | — | — |
| 16'h1300 | ⤬ rep1 | 4'hc | 0 | 4 | 2'b01 | 6'b110001 | $y_{1300}$ |
| 16'h1400 | | 4'hc | 1 | 4 | 2'b01 | — | — |
| 16'h1500 | | 4'hc | 2 | 4 | 2'b01 | — | — |
| 16'h1600 | | 4'hc | 3 | 4 | 2'b01 | — | — |
| 16'h1700 | ⤬ rep2 | 4'hc | 0 | 4 | 2'b10 | 6'b110010 | $y_{1700}$ |
| 16'h1800 | | 4'hc | 1 | 4 | 2'b10 | — | — |
| 16'h1900 | | 4'hc | 2 | 4 | 2'b10 | — | — |
| 16'h1a00 | | 4'hc | 3 | 4 | 2'b10 | — | — |
| 16'h1b00 | ⤬ rep3 | 4'hc | 0 | 5 | 2'b11 | 6'b110011 | $y_{1b00}$ |
| 16'h1c00 | | 4'hc | 1 | 5 | 2'b11 | — | — |
| 16'h1d00 | | 4'hc | 2 | 5 | 2'b11 | — | — |
| 16'h1e00 | | 4'hc | 3 | 5 | 2'b11 | — | — |
| 16'h1f00 | → | 4'hc | 4 | 5 | 2'b11 | — | — |
| 16'h2000 | rep0 | 4'hd | 0 | 3 | 2'b00 | 6'b110100 | $y_{2000}$ |
| ‥ | | ‥ | ‥ | ‥ | ‥ | ‥ | ‥ |

FIG.12

| INPUT DATA | L1 DATA | L2 DATA | TABLE ADDRESS | INCREMENT OF THE INPUT DATA | CONVERTED DATA |
|---|---|---|---|---|---|
| 16'h0000 | 4'h0 | 2'b00 | | 16'h0001 | |
| 16'h0001 | 4'h0 | 2'b00 | 6'b0000000 | 16'h0001 | y$_{0001}$ |
| 16'h0002 | 4'h1 | 2'b00 | 6'b0000100 | 16'h0001 | y$_{0002}$ |
| 16'h0003 | 4'h1 | 2'b11 | 6'b0000111 | 16'h0001 | y$_{0003}$ |
| 16'h0004 | 4'h2 | 2'b00 | 6'b0001000 | 16'h0001 | y$_{0004}$ |
| 16'h0005 | 4'h2 | 2'b10 | 6'b0001010 | 16'h0001 | y$_{0005}$ |
| 16'h0006 | 4'h2 | 2'b11 | 6'b0001011 | 16'h0001 | y$_{0006}$ |
| 16'h0007 | 4'h2 | 2'b11 | 6'b0001011 | 16'h0001 | y$_{0007}$ |
| 16'h0008 | 4'h3 | 2'b00 | 6'b0001100 | 16'h0001 | y$_{0008}$ |
| 16'h0009 | 4'h3 | 2'b01 | 6'b0001101 | 16'h0001 | y$_{0009}$ |
| 16'h000a | 4'h3 | 2'b10 | 6'b0001110 | 16'h0002 | y$_{000a}$ |
| 16'h000b | 4'h3 | 2'b10 | | | |
| 16'h000c | 4'h3 | 2'b11 | 6'b0001111 | 16'h0004 | y$_{000c}$ |
| 16'h000d | 4'h3 | 2'b11 | | | |
| 16'h000e | 4'h3 | 2'b11 | | | |
| 16'h000f | 4'h3 | 2'b11 | | | |
| 16'h0010 | 4'h4 | 2'b00 | 6'b0010000 | 16'h0004 | y$_{0010}$ |
| .. | .. | .. | .. | .. | .. |
| 16'hc000 | 4'hf | 2'b11 | 6'b1111111 | 16'h4000 | y$_{c000}$ |
| .. | .. | .. | .. | .. | .. |
| 16'hffff | 4'hf | 2'b11 | | | |

FIG.18

| INPUT DATA | TABLE ADDRESS | CONVERTED DATA |
|---|---|---|
| 16'h0001 | 6'b000000 | $y_{0001}$ |
| 16'h0002 | 6'b000100 | $y_{0002}$ |
| 16'h0003 | 6'b000111 | $y_{0003}$ |
| 16'h0004 | 6'b001000 | $y_{0004}$ |
| 16'h0005 | 6'b001010 | $y_{0005}$ |
| 16'h0006 | 6'b001011 | $y_{0006}$ |
| 16'h0007 | 6'b001011 | $y_{0007}$ |
| 16'h0008 | 6'b001100 | $y_{0008}$ |
| 16'h0009 | 6'b001101 | $y_{0009}$ |
| 16'h000a | 6'b001110 | $y_{000a}$ |
| 16'h000c | 6'b001111 | $y_{000c}$ |
| 16'h0010 | 6'b010000 | $y_{0010}$ |
| 16'h0012 | 6'b010001 | $y_{0012}$ |
| 16'h0014 | 6'b010010 | $y_{0014}$ |
| 16'h0018 | 6'b010011 | $y_{0018}$ |
| 16'h0020 | 6'b010100 | $y_{0020}$ |
| 16'h0024 | 6'b010101 | $y_{0024}$ |
| 16'h0028 | 6'b010110 | $y_{0028}$ |
| 16'h0030 | 6'b010111 | $y_{0030}$ |
| 16'h0040 | 6'b011000 | $y_{0040}$ |
| 16'h0048 | 6'b011001 | $y_{0048}$ |
| 16'h0050 | 6'b011010 | $y_{0050}$ |
| 16'h0060 | 6'b011011 | $y_{0060}$ |
| 16'h0080 | 6'b011100 | $y_{0080}$ |
| 16'h0090 | 6'b011101 | $y_{0090}$ |
| 16'h00a0 | 6'b011110 | $y_{00a0}$ |
| 16'h00c0 | 6'b011111 | $y_{00c0}$ |

FIG.19

| INPUT DATA | TABLE ADDRESS | CONVERTED DATA |
|---|---|---|
| 16'h0100 | 6'b100000 | $y_{0100}$ |
| 16'h0120 | 6'b100001 | $y_{0120}$ |
| 16'h0140 | 6'b100010 | $y_{0140}$ |
| 16'h0180 | 6'b100011 | $y_{0180}$ |
| 16'h0200 | 6'b100100 | $y_{0200}$ |
| 16'h0240 | 6'b100101 | $y_{0240}$ |
| 16'h0280 | 6'b100110 | $y_{0280}$ |
| 16'h0300 | 6'b100111 | $y_{0300}$ |
| 16'h0400 | 6'b101000 | $y_{0400}$ |
| 16'h0480 | 6'b101001 | $y_{0480}$ |
| 16'h0500 | 6'b101010 | $y_{0500}$ |
| 16'h0600 | 6'b101011 | $y_{0600}$ |
| 16'h0800 | 6'b101100 | $y_{0800}$ |
| 16'h0900 | 6'b101101 | $y_{0900}$ |
| 16'h0a00 | 6'b101110 | $y_{0a00}$ |
| 16'h0c00 | 6'b101111 | $y_{0c00}$ |
| 16'h1000 | 6'b110000 | $y_{1000}$ |
| 16'h1200 | 6'b110001 | $y_{1200}$ |
| 16'h1400 | 6'b110010 | $y_{1400}$ |
| 16'h1800 | 6'b110011 | $y_{1800}$ |
| 16'h2000 | 6'b110100 | $y_{2000}$ |
| 16'h2400 | 6'b110101 | $y_{2400}$ |
| 16'h2800 | 6'b110110 | $y_{2800}$ |
| 16'h3000 | 6'b110111 | $y_{3000}$ |
| 16'h4000 | 6'b111000 | $y_{4000}$ |
| 16'h4800 | 6'b111001 | $y_{4800}$ |
| 16'h5000 | 6'b111010 | $y_{5000}$ |

FIG.20

| INPUT DATA | TABLE ADDRESS | CONVERTED DATA |
|---|---|---|
| 16'h6000 | 6'b111011 | $y_{6000}$ |
| 16'h8000 | 6'b111100 | $y_{8000}$ |
| 16'h9000 | 6'b111101 | $y_{9000}$ |
| 16'ha000 | 6'b111110 | $y_{a000}$ |
| 16'hc000 | 6'b111111 | $y_{c000}$ |

FIG.21

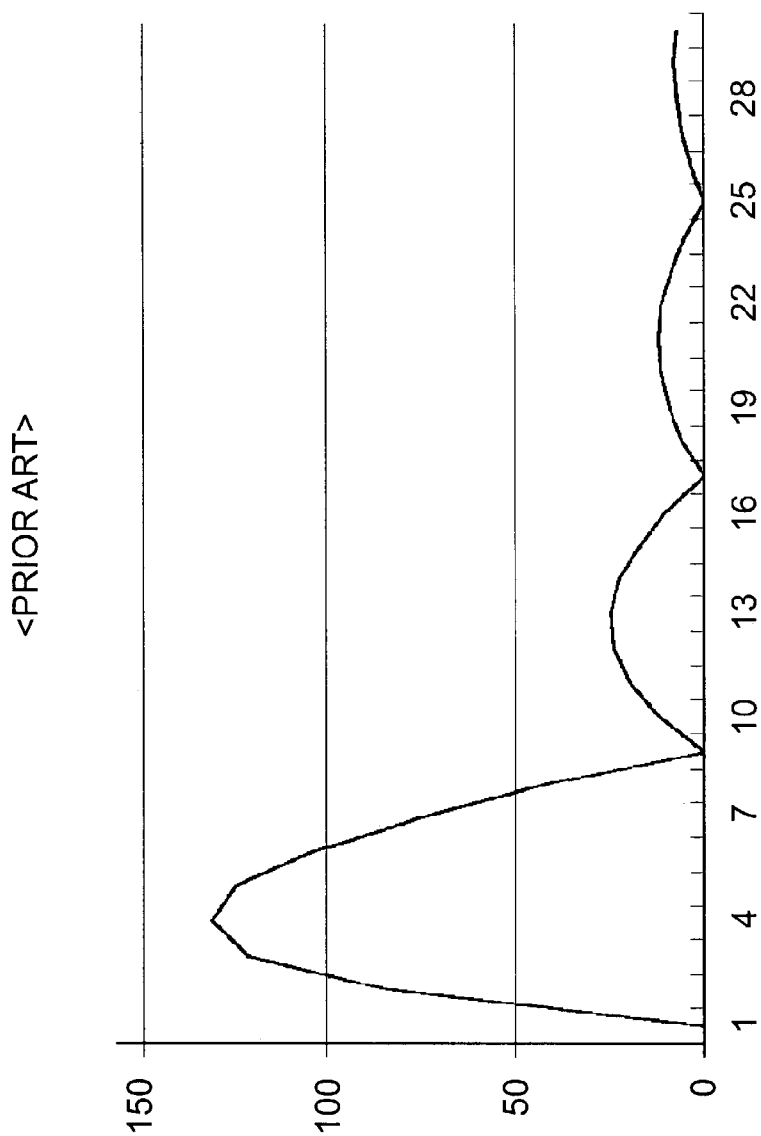
FIG.29 <PRIOR ART>

DATA CONVERSION METHOD, A DATA CONVERSION CIRCUIT AND A DATA CONVERSION PROGRAM

FIELD OF THE INVENTION

The present invention relates to a data conversion method, a data conversion circuit and a data conversion program which convert input data and generate output data thereby, and, more specifically, a data conversion method, a data conversion circuit and a data conversion program which generate output data by implementing gamma-conversion on input data.

BACKGROUND ART

Generally, in an image tube such as CRT, the relationship between drive voltage E and cathode current I is expressed by the following formula.

$$I = KE^\gamma \quad \gamma\text{:gamma}$$

This relationship is referred to as the gamma ($\gamma$) characteristic. Cathode current I has non-linearity in response to drive voltage E since the value of gamma is generally around 1.6 to 3. An image transmission side totally sets $\gamma=1$ by installing a gamma-correction circuit since it is difficult to set $\gamma=1$ in an image tube. In the present application, a gamma conversion is defined as implementing conversion to an image signal as gamma correction.

In an image reading device or an image processing LSI for an image display unit, image data is gamma-converted. When an input is x and an output is y, gamma conversion is expressed as the following formula.

Equation 1

$$y = x^{\frac{1}{\gamma}} \tag{1}$$

FIG. 26 shows a chart of formula (1) when gamma $\gamma=1.8$. Gamma conversion is a power function so that a lot of time is necessary to calculate it. However, high-speed gamma-conversion is required since image-reading equipment is operated with high speed. Therefore, in a conventional technique, a conversion table of converted data corresponding to input data is stored by a high-speed memory cell such as SRAM. Then, converted data is read out from a conversion table corresponding to input data.

FIG. 27 shows a diagram of a conventional gamma-conversion circuit. As shown in FIG. 27, a conventional gamma-conversion circuit 70 is provided with a conversion-table storing portion 71 to store a conversion table of converted data corresponding to input data. The circuit 70 outputs the converted data corresponding to the input data. In this case, the conversion-table storing portion 71 is in the form of a high-speed memory cell SRAM.

In gamma-conversion circuit 70, when the input data is 12 bits, and the output data is 8 bits, for example, the size of the conversion table becomes 4096 words (here, a single word=8 bits) so that it is necessary for the memory capacity of the conversion-table storing portion 71 to hold 4096 words. Further, when the input data is 16 bits, and the output data is 12 bits, the size of the conversion table becomes 65536 words (here, a single word 12 bits) so that it is necessary for the memory capacity of the conversion-table storing portion 71 to hold 65536 words. It is extremely difficult to integrate SRAM of a high capacity for storing such large sized conversion tables into a LSI for image processing. Further, even if a SRAM of such a high capacity can be integrated into a LSI for image processing, this causes cost increase of the LSI for image processing.

Further, in order to make the conversion table small, the conversion table having the converted data corresponding to the input data every predetermined period (for example, 16) is stored in a SRAM. When the input data corresponding to the converted data is stored in the conversion table is input, such converted data is output. When the input data which does not correspond to the converted data stored in the conversion table is input, other input data located before or after the subject input data, which corresponds to the converted data stored in the conversion table, is processed with interpolation and output.

FIG. 28 shows a diagram of such a conventional gamma-conversion circuit. As shown in FIG. 28, a conventional gamma-conversion circuit 80 comprises a conversion-table storing portion 81, which stores the conversion table having the converted data corresponding to the input data every specific period and a processing portion for interpolation 82 to process interpolation on the output data from the conversion-table storing portion 81. In this case, the conversion-table storing portion 81 is in the form of high-speed memory cells of SRAM.

In the gamma-conversion circuit 80, when the input data is 12 bits, the output data is 8 bits and a period of the input data corresponding to the converted data is 16, for example, the size of the conversion table becomes 256 words (here, a single word=8 bits) and the memory capacity needed for the conversion-table storing portion 81 is reduced to 256 words. Further, when the input data is 16 bits, the output data is 12 bits and a period of the input data is 16, the size of the conversion table becomes 4096 words (here, a single word=12 bits) and the memory capacity needed for the conversion-table storing portion 81 is reduced to 4096 words.

However, the output data from the gamma-conversion circuit 80 includes errors since these are calculated by interpolation processing. FIG. 29 shows the errors between the formula (1) and output data from the gamma-conversion circuit 80 when the input data is 16 bits, the output data is 16-bits, and a period of the input data corresponding the converted data is 16. As shown in FIG. 29, the output data from the gamma-conversion circuit 80 has about 130 errors at its maximum.

Therefore, in view of the foregoing, one object of the present invention is to decrease memory capacity of the circuit for storing converted data and to provide a data conversion method, a data conversion circuit and a data conversion program while decreasing the errors in the output data.

SUMMARY

In order to overcome the above-mentioned problem, a first data conversion method with regard to the present invention is a data conversion method generating output data by converting input data and comprises the following steps: a step (a) of obtaining first data of m-bits width, which indicates a bit number L located at the most significant bit within bits of "1" in the input data; a step (b) of obtaining second data of n-bits width from bit number (L-1) to (L-n); a step (c) of generating a first address of (m+n)-bits width by combining the first data with the second data; a step (d) of generating a second address by incrementing or decrementing the first address; a step (e) of reading a first converted data corresponding to the first address and a second converted data corresponding to the second address by a memory means storing converted data, obtained via predetermined-converting of the input data, corresponding to the address generated from the input data; and a step (f) of generating the output data based on the first and the second converted data.

Here, the step (f) may be a step for generating output data by interpolation-processing based on the first and the second converted data. In addition, n may be two, three or four.

A second data conversion method with regard to the present invention is a data conversion method generating output data by converting input data and comprises the following steps: a step (a) of obtaining first data of m-bits width, which indicates a bit number L located at the most significant bit within bits of "1" in the input data; a step (b) of extracting second data of n-bits width from a bit number (L-1) to (L-n) within the input data, and obtaining third data of k-bits width by predetermined-processing of the second data; a step (c) of generating a first address of (m+k) bits width by combining the first data with the third data; a step (d) of generating a second address by incrementing or decrementing the first address; a step (e) of reading a first converted data corresponding to the first address and a second converted data corresponding to the second address by a memory means storing converted data, obtained via predetermined-converting of the input data, corresponding to the address generated from the input data; and a step (f) of generating the output data based on the first and the second converted data.

Here, the step (f) may be a step for generating output data by interpolation-processing based on the first and the second converted data. Further, the step (b) may obtain the third data by dividing the second data of 0 to $(2^n-1)$ into N groups so that the numbers of data become $V_0<V_1<\ldots<V_N$ when the numbers of data belonging to the i group are $V_i$. Further, n may be three, four or five.

A third data conversion method with regard to the present invention is a data conversion method generating output data by converting input data and comprises the following steps: a step (a) of obtaining first data of m-bits width, which indicates a bit number L located at the most significant bit within bits of "1" in the input data; a step (b) of extracting second data of n-bits width from a bit number (L-1) to (L-n) within the input data, and obtaining third data of k-bits width, which indicates a bit number located at the most significant bit within bits of "1" in the second data; a step (c) of generating a first address of (m+k) bits width by combining the first data with the third data; a step (d) of generating a second address by incrementing or decrementing the first address; a step (e) of reading a first converted data corresponding to the first address and a second converted data corresponding to the second address by a memory means storing the converted data, obtained via predetermined-converting of the input data, corresponding to the address generated from the input data; and a step (f) of generating the output data based on the first and the second converted data.

Here, the step (f) may include a step of generating output data by interpolation-processing based on the first and the second converted data. Further n may be 3.

Further, the interpolation-processing may be a linear interpolation in the first, second and third methods of data conversion according to the present invention. In addition, the conversion may be gamma conversion. Furthermore, the method may further comprises: a step (g) of disassembling the data into two sections in order to express data having the same bit numbers as that of the input data in the form of $2^{-A}$ B by using natural numbers A and real numbers B; a step (h) of reading two converted data, of which one corresponds to each of the two sections, from a table storing the converted data obtained by predetermined-converting of a plurality of data which have equivalent periods; and a step (i) of obtaining converted data expressed in the form of $2^{-A}$ B by multiplying two converted data, wherein; the converted data which is stored in the memory means is obtained by repeating the steps (g) to (i) for a plurality of data.

A first data-conversion circuit with regard to the present invention is a data conversion circuit generating output data by converting input data and comprises the following: a first means for obtaining first data of m-bits width, which indicates a bit number L located at the most significant bit within bits of "1" in the input data; a second means for obtaining second data of n-bits width, which follows data of bit number L in the input data; a third means for generating a first address of (m+n)-bits width by combining the first data with the second data, and generating a second address by incrementing or decrementing the first address; a fourth means for storing the converted data, obtained via predetermined-converting of the input data, corresponding to the address generated from the input data; a fifth means for reading a first converted data, corresponding to the first address generated by the third means, and a second converted data, corresponding to the second address generated by the third means, from the fourth means; and a sixth means for generating the output data based on the first and the second converted data.

Here, the sixth means may include a means for generating output data by interpolation-processing based on the first and the second converted data.

A second data conversion circuit with regard to the present invention is a data conversion circuit generating output data by converting input data and may comprise the following: a first means for obtaining first data of m-bits width, which indicates a bit number L located at the most significant bit within bits of "1" in the input data; a second means for extracting second data of n-bits width from bit numbers (L-1) to (L-n) within the input data, and obtaining third data of k-bits width by predetermined-processing of the second data; a third means for generating a first address of (m+k)-bits width by combining the first data with the third data, and generating a second address by incrementing or decrementing the first address; a fourth means for storing converted data, obtained via predetermined-converting of the input data, corresponding to the address generated from the input data; a fifth means for reading a first converted data corresponding to the first address and a second converted data corresponding to the second address by the fourth means; and a sixth means for generating the output data based on the first and the second converted data.

Here, the sixth means may be a means for generating output data by interpolation-processing based on the first and the second converted data. Further, the second means may obtain the third data by dividing the second data of 0 to $(2^n-1)$ into N groups so that the numbers of data in the second means become $V_0<V_1<\ldots<V_N$ when the numbers of the data belonging to the i group are $V_i$.

A third data conversion circuit with regard to the present invention is a data conversion circuit generating output data by converting input data and comprises the following: a first means for obtaining first data of m-bits width, which indicates a bit number L located at the most significant bit within bits of "1" in the input data; a second means for extracting second data of n-bits width from bit numbers (L-1) to (L-n) within the input data, and obtaining third data of k-bits width, which indicates a bit number located at the most significant bit within bits of "1" in the second data; a third means for generating a first address of (m+k) bits width by combining the first data with the third data, and generating a second address by incrementing or decrementing the first address; a fourth means for storing converted data, obtained via predetermined-converting of the input data, corresponding to the address generated from the input data; a fifth means for reading a first converted data corresponding to the first address and a second converted data corresponding to the second address by the fourth means; and a sixth means for generating the output data based on the first and the second converted data.

Here, the sixth means may be a means for generating output data by interpolation-processing based on the first and the second converted data. Further, the interpolation-processing may be a linear interpolation.

Here, the interpolation-processing may be a linear interpolation in the first, second and third circuits of data conversion according to the present invention. In addition, the predetermined conversion may be gamma conversion.

A first program of data conversion with regard to the present invention is a data conversion program generating output data by converting input data and makes an information-processing unit to implement the following steps: a step (a) of obtaining first data of m-bits width, which indicates a bit number L located at the most significant bit within bits of "1" in the input data; a step (b) of obtaining second data of n-bits width, following the data of bit number L in the input data; a step (c) of generating a first address of (m+n)-bits width by combining the first data with the second data; a step (d) of generating a second address by incrementing or decrementing the first address; a step (e) of reading a first converted data corresponding to the first address and a second converted data corresponding to the second address by a memory means storing the converted data, obtained via predetermined-converting of the input data, corresponding to the address generated from the input data; and a step (f) of generating the output data based on the first and the second converted data.

Here, the step (f) may be a step for generating output data by interpolation-processing based on the first and the second converted data.

A second program of data conversion with regard to the present invention is a data conversion program generating output data by converting input data and makes an information-processing unit to implement the following steps: a step (a) of obtaining first data of m-bits width, which indicates a bit number L located at the most significant bit within bits of "1" in the input data; a step (b) of extracting second data of n-bits width from bit numbers (L-1) to (L-n) within the input data, and obtaining third data of k-bits width by predetermined-processing of the second data; a step (c) of generating a first address of (m+k)-bits width by combining the first data with the third data; a step (d) of generating a second address by incrementing or decrementing the first address; a step (e) of reading a first converted data corresponding to the first address and a second converted data corresponding to the second address by a memory means storing the converted data, obtained via predetermined-converting of the input data, corresponding to the address generated from the input data,; and a step (f) of generating the output data based on the first and the second converted data.

Here, the step (f) may be a means for generating the output data by interpolation-processing based on the first and the second converted data.

Further, the step (b) may obtain the third data by dividing the second data of 0 to $(2^n-1)$ into N groups so that the numbers of data become $V_0 < V_1 < \ldots < V_N$ when the numbers of the data belonging to the i group are $V_i$.

A third program of data conversion with regard to the present invention is a data conversion program generating output data by converting input data and makes an information-processing unit to implement the following steps: a step (a) of obtaining first data of m-bits width, which indicates a bit number L located at the most significant bit within bits of "1" in the input data; a step (b) of extracting second data of n-bits width from bit number (L-1) to (L-n) within the input data, and obtaining third data of k-bits width, which indicates a bit number located at the most significant bit within bits of "1" in the second data; a step (c) of generating a first address of (m+k)-bits width by combining the first data with the third data; a step (d) of generating a second address by incrementing or decrementing the first address; a step (e) of reading a first converted data corresponding to the first address and a second converted data corresponding to the second address by a memory means storing the converted data, obtained via predetermined-converting of the input data, corresponding to the address generated from the input data; and a step (f) of generating the output data based on the first and the second converted data.

Here, the step (f) may be a means for generating output data by interpolation-processing based on the first and the second converted data.

Here, the step (f) may be a means for generating output data by interpolation-processing based on the first and the second converted data in the first, second and third programs of data conversion according to the present invention. Further, the interpolation-processing may be a linear interpolation. In addition, the predetermined-conversion may be gamma conversion. Furthermore, the program may further comprise: a step (g) of disassembling the data into two sections in order to express the data having the same bit numbers as that of the input data as the form of $2^{-A}$ B by using natural numbers A and real numbers B; a step (h) of reading two converted data corresponding to each of the two sections from a table storing the converted data obtained by predetermined-converting of a plurality of data which have equivalent periods; and a step (i) of obtaining converted data expressed in the form of $2^{-A}$ B by multiplying the two converted data, wherein the converted data are obtained by repeating the step (g) to (i) for a plurality of data.

BRIEF DESCRIPTION OF THE DRAWINGS

FIG. 2 shows the relationship among input data, L data, N data, table address, increments of the input data and converted data in the first embodiment of the present invention.

FIG. 3 shows the relationship among the input data, the table address and the converted data in the first embodiment of the present invention.

FIG. 4 shows the relationship among the input data, the table address and the converted data in the first embodiment of the present invention.

FIG. 12 shows the relationship among the input data, the range of input data, j data, dd data, span data, repi data, the table address and the converted data in the second embodiment of the present invention.

FIG. 18 shows the relationship among the input data, L1 data, L2 data, the table address, the increments of the input data and the converted data in the third embodiment of the present invention.

FIG. 19 shows the relationship among the input data, the table address and the converted data in the third embodiment of the present invention.

FIG. 20 shows the relationship among the input data, the table address and the converted data in the third embodiment of the present invention.

FIG. 21 shows the relationship among the input data, the table address and the converted data in the third embodiment of the present invention.

FIG. 29 shows errors of the output data of the gamma-conversion circuit of FIG. 28 where the constitution of the conventional gamma-conversion circuit is shown.

DETAILED DESCRIPTION

The preferred embodiment of the present invention will be explained with reference to drawings hereafter. Here, the same reference numbers refer to the same elements and duplicate explanation is omitted.

Figure 1:
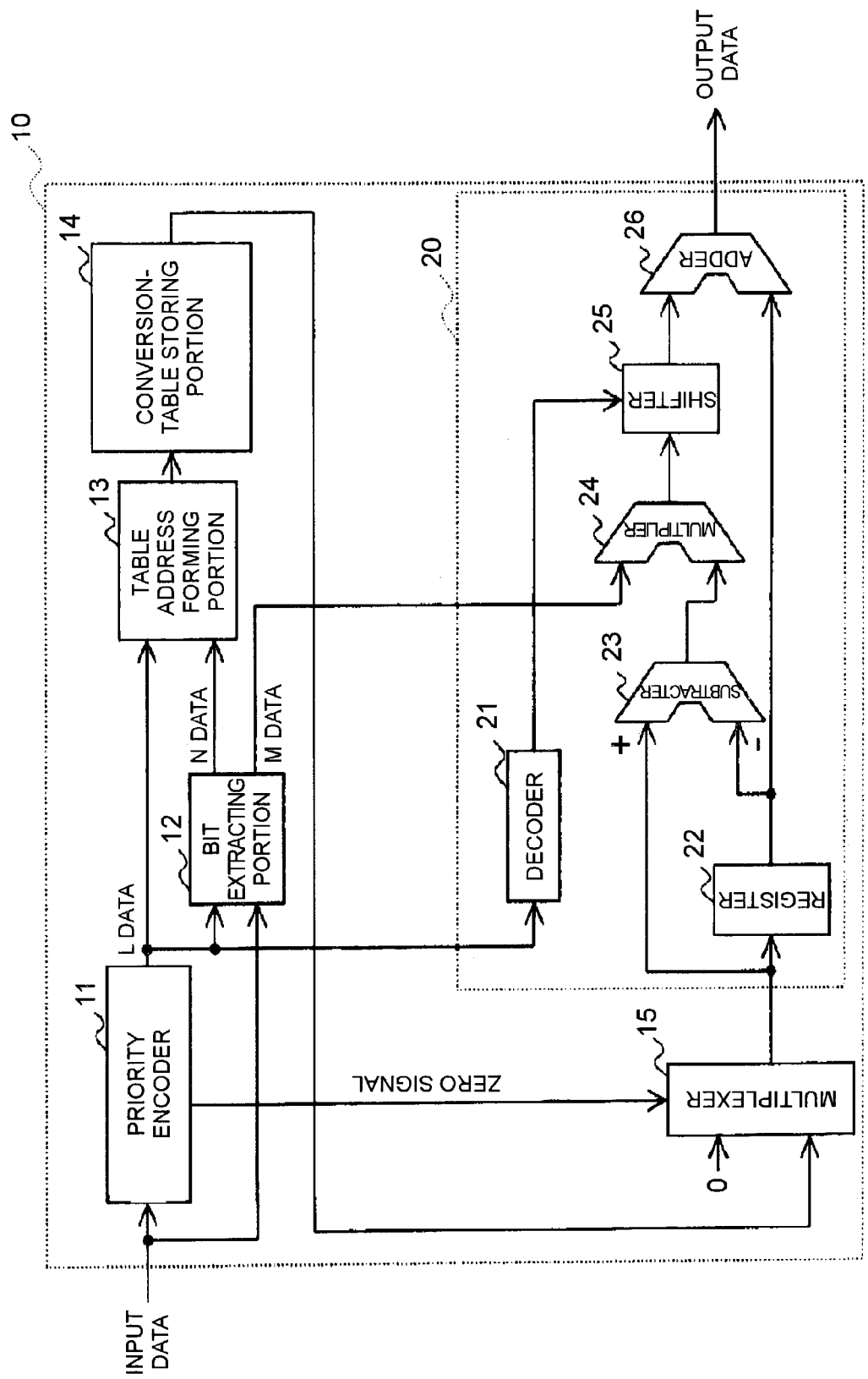
FIG. 1 shows a constitution of a gamma-conversion circuit related to a first embodiment of the present invention.

FIG. 1 shows a constitution of a data conversion circuit related to the first embodiment of the present invention. In the present embodiment, a gamma-conversion circuit is applied to the present invention. Further, in the present embodiment, the input data have a 16-bits width, and the output data have a 12-bits width.

In FIG. 1, a gamma-conversion circuit 10 comprises a priority encoder 11, a bit-extracting portion 12, a table address-forming portion 13, a conversion-table storing portion 14, a multiplexer 15 and a linear-interpolation portion 20. Further, a linear-interpolation portion 20 includes a decoder 21, a register 22, a subtracter 23, a multiplier 24, a shifter 25 and an adder 26.

The priority encoder 11 inputs the input data of a 16-bits width, detects "1" bit located at the most significant bit within the input data and outputs the bit number of the detected bit as L data of a 4-bits width. Here, in general, the bit number of the least significant bit is 0 and a bit number is counted toward the high-order bit. Hence, following above general approach in the present embodiment, the bit number of the least significant bit is 0 and the bit number of the most significant bit is 15.

For example, when the input data is "16'h0001" (here, "16'" shows data of a 16-bits width, "h" shows hexadecimal representation and "0001" shows the value of the input data), the priority encoder 11 outputs "4'h0" L data (here, "4'" shows data of a 4-bits width, "h" shows hexadecimal representation and "0" shows the value of L data). When the input data is "16'h0002", the priority encoder 11 outputs "4'h1" L data and when the input data is "16'h0003", the priority encoder 11 outputs "4'h1" L data.

Further, in the absence of bits of "1" in the input data, namely in the case of "16'h0000", the priority encoder 11 outputs "4'h0" of L data and also a high level zero signal.

The bit-extracting portion 12 inputs the input data and the L data and outputs 2 bits of the bit numbers (L-1) to (L-2) as the N data. For example, when input data is "16'h0004" L data are "4'h2" (here, "2'" shows data of a 2-bits width, "b" shows binary representation and "00" shows the value of the data), the bit-extracting portion 12 outputs N data of "2'b00".

When input data is "16'h005" and L data is "4'h2", the bit-extracting portion 12 outputs "2'b00" of N data. Here, the bit-extracting portion 12 outputs N data of "2'b00", when less than or equal to "4'h2" namely when input data is "16'h0000" and L data is "4'h0". It outputs N data of "2'b00", when input data is "16'h0001" and L data are "4'h0". outputs N data of "2'b00", when input data is "16'h0002" and L data are "4'h1". It outputs N data of "2'b10", when input data is "16'h0003" and L data are "4'h1".

Further, the bit-extracting portion 12 outputs M data, where the (L-2) bit of the bit numbers (L-3) to 0 within the input data is zero-expanded to have a 16-bits width, to the multiplier 19. For example, when input data is "16'h0009", and L data are "4'h3," the bit-extracting portion 12 outputs M data of "16'h0001" where "1'b1" of the bit number 0 in the input data is zero-expanded to have a 16-bits width, to the multiplier 24. In addition, when, for example, input data is "16' h0013", and L data are "4' h4," the bit-extracting portion 12 outputs M data of "16' h0003" where "2' b11" of the bit numbers 1 to 0 in the input data is zero-expanded to have a 16-bits width, to the multiplier 24.

The table address-forming portion 13 inputs the L data of a 4-bits width and the N data of a 2-bits width, outputs a first table address of 6 bits, which is obtained by combining the L data as a high-order bit with N data as a low-order bit. Then, it outputs a second table address, which is obtained by incrementing (or decrementing) data where L data is combined with N data. For example, when L data is "4' h3" and N data is "2' b00," the table address-forming portion 14 outputs "6' b001100" as the first table address and outputs "6'b 001101" as the second table address, after a given time has elapsed.

The conversion-table storing portion 14 stores the conversion table that makes converted data of a 12-bits width, which is obtained by gamma-converting the predetermined input data, to correspond to the table address, and outputs the first and the second converted data corresponding to the first and the second table addresses.

FIG. 2 shows a relationship among the input data, the L data, the N data, the table address, the increment of the input data and the converted data. In FIG. 2, $y_{0001}$ is the data of a 12-bits width, obtained by gamma-converting the input data "16' h0001", $y_{0002}$ is the data of a 12-bits width, obtained by gamma-converting the input data "16' h0002", $y_{0003}$ is the data of a 12-bits width, obtained by gamma-converting the input data "16' h0003", $y_{0004}$ is the data of a 12-bits width, obtained by gamma-converting the input data "16' h0004". Further, $y_{0005}$ is the data of a 12-bits width, obtained by gamma-converting the input data "16' h0005", $y_{0006}$ is the data of a 12-bits width, obtained by gamma-converting the input data "16' h0006", $y_{0007}$ is the data of a 12-bits width, obtained by gamma-converting the input data "16' h0007", $y_{0008}$ is the data of a 12-bits width, obtained by gamma-converting the input data "16' h0008". Further, $y_{000a}$ is the data of a 12-bits width, obtained by gamma-converting the input data "16' h000a", $y_{000c}$ is the data of a 12-bits width, obtained by gamma-converting the input data "16' h000c", $y_{000e}$ is the data of a 12-bits width, obtained by gamma-converting the input data "16' h000e", $y_{0010}$ is the data of a 12-bits width, obtained by gamma-converting the input data "16' h0010", $y_{e000}$ is the data of a 12-bits width, obtained by gamma-converting the input data "16' he000".

As shown in FIG. 2, for example, when the input data is "16' h0008", the table address becomes "6' b001100," and when the input data is "16' h0009", the table address also becomes "6 'b001100". In this case, the conversion-table storing portion 14 stores the converted data $y_{0008}$, obtained by gamma-converting the input data "16' h0008", while making them correspond with the table address "6' b001100" and does not store the converted data obtained by gamma-converting the input data "16' h0009".

Hence, when the same table addresses are generated by plural input data, the conversion-table storing portion 14 stores only the converted data obtained by gamma-converting the minimum input data within the plural input data, with making them correspond with the table addresses generated from the plural input data.

Figures 5, 6:
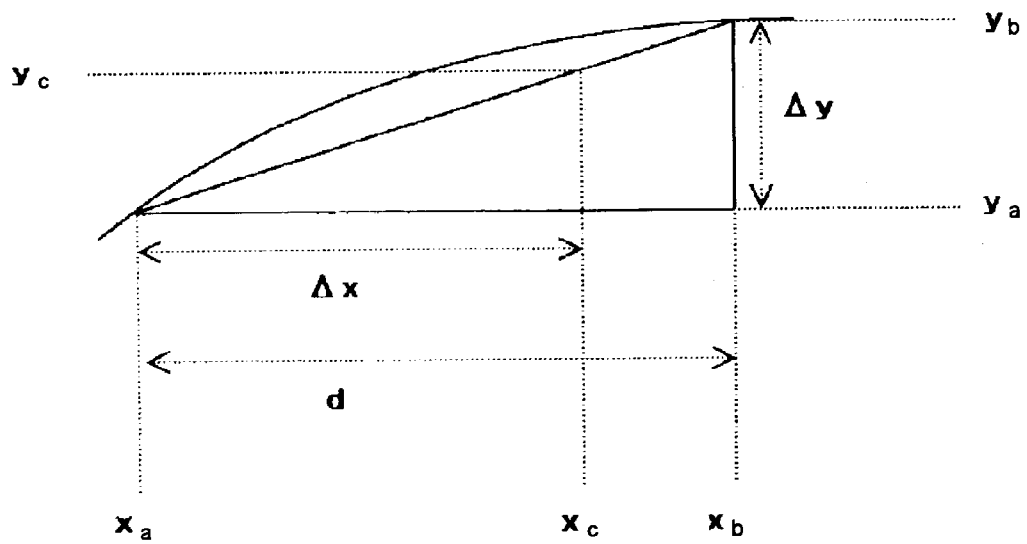
FIG. 5 shows the relationship among the input data, the table address and the converted data in the first embodiment of the present invention.
FIG. 6 shows the principle of linear-interpolation processing in the first embodiment of the present invention.

FIGS. 3 to 5 show the relationship among input data, table address and converted data. In FIG. 3 to FIG. 5, the input data corresponding to converted data, which is not stored in the conversion-table storing portion 14, is not shown. As shown in FIG. 3 to FIG. 5, converted data become 59 data from $y_{0001}$ to $y_{e000}$ in response to the input data (in the present embodiment, data varies by combinations of 65536 from "16' h0000" to "16' hffff"). Therefore, the conversion-table storing portion 14 may have a memory capacity of 59 words (here, a single word=12 bits).

Here, as shown in FIG. 3 to FIG. 5, in the range of "16' h0008" to "16' h0010" of input data, the conversion-table storing portion 14 stores the converted data, $y_{000a}$, $y_{000c}$ and $y_{000e}$ corresponding to "16' h000a", "16' h000c" and "16' h000e" repsectively which are input data dividing this range into four equal portions. Similarly, the conversion-table storing portion 14 stores the converted data, corresponding to the input data respectively which divide the range of "16' h0010" to "16' h0020", "16' h0020" to "16' h0040", "16' h0040" to "16' h0080", "16' h0080" to "16' h0100", "16' h0100" to "16' h0200", "16' h0200" to "16' h0400", "16' h0400" to "16' h0800", "16'h0800" to "16' h1000", "16' h1000" to "16' h2000", "16' h2000" to "16' h4000", "16' h4000" to "16' h8000", and "16' h8000" to "16' h10000" into four equal portions. Referring to FIG. 1 again, the multiplexer 15 selects "zero" and outputs it, when a zero signal is at a high level, and selects converted data output by the conversion-table storing portion 14 and outputs them, when the zero signal is at a low level.

A linear interpolation portion 20 applies linear-interpolation to the first and second converted data output by the conversion-table storing portion 14. A decoder 21 outputs the data obtained through subtracting 2 from L data, to a shifter 25. For example, the decoder 21 outputs "4' h1" to the shifter 25 when L data is "4' h3" and outputs "4' h2" to the shifter 25 when L data is "4' h4".

A register 22 maintains the output from the multiplexer 15 during a predetermined time.

A subtracter 23 subtracts the output data of the register 22 from the output data of the multiplexer 15 and outputs them. A multiplier 24 multiplies the output data of subtracter 23 by the M data and outputs them.

The shifter 25 shifts output data of the multiplier 24 to the right by the value of the output data of the decoder 21. The shifter 25 functions as a divider. An adder 26 adds the output data of the multiplexer 15 to the output data (gamma-converted data) of the shifter 25 and outputs them.

Next, linear-interpolation processing by the linear interpolation portion 20 will be described with reference to FIG. 6. FIG. 6 shows the principle of linear interpolation processing by the linear interpolation portion 20. As shown in FIG. 6, linear interpolation portion 20 can calculate converted data $y_c$ corresponding to input data $x_c$ by the following formula.

Equation 2

$$y_c = y_a + \Delta y \cdot \Delta x \cdot \frac{1}{d} \qquad (2)$$

Figure 7:
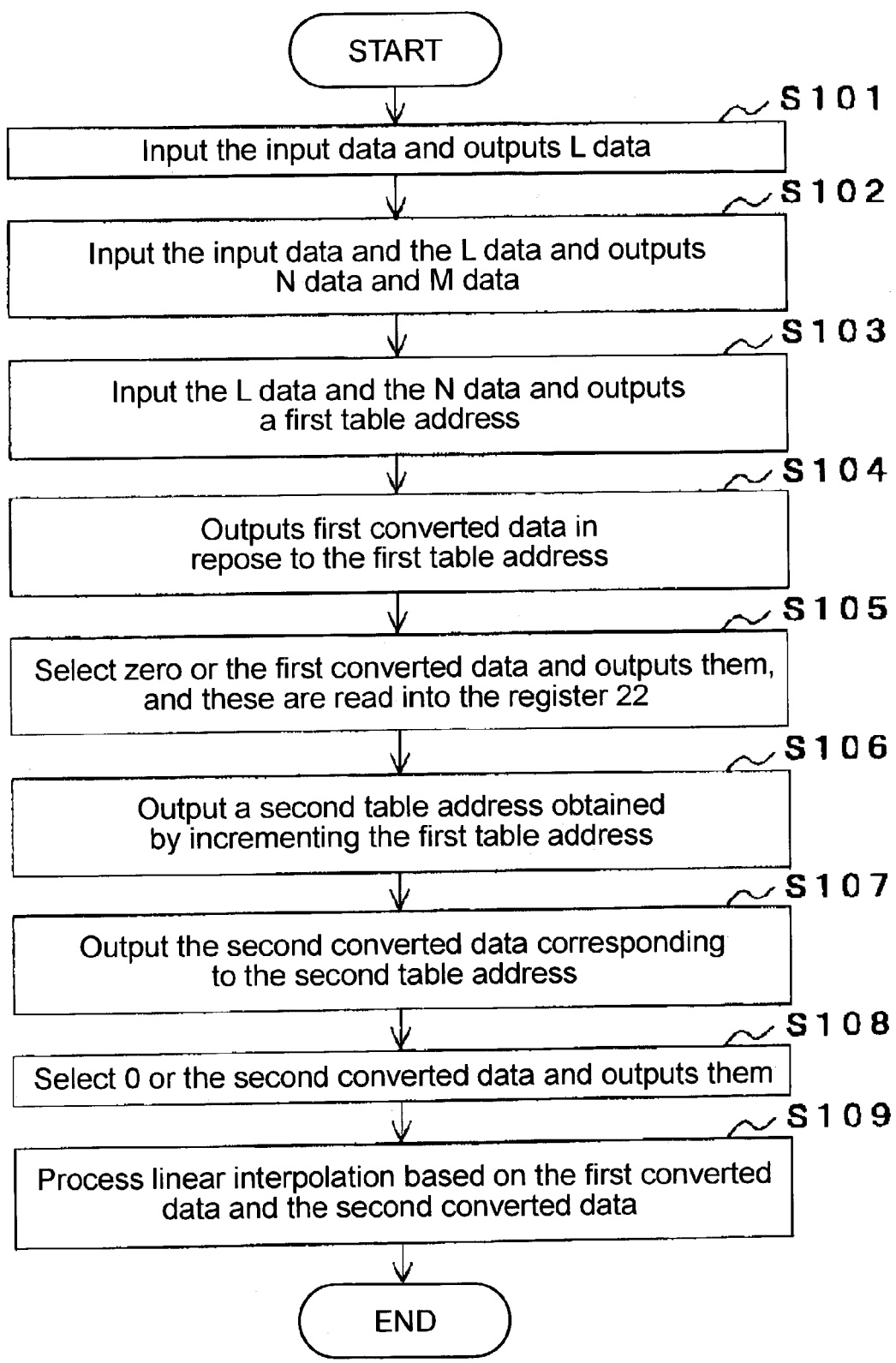
FIG. 7 shows a flow chart of operation of the gamma-conversion circuit related to the first embodiment of the present invention.

Next, gamma transformation processed by the gamma-conversion circuit will be described with reference to FIG. 1, FIG. 7 and FIG. 8. FIG. 7 shows a flow chart of gamma transformation processed by the gamma-conversion circuit, FIG. 8 shows a flow chart of a linear interpolation processed by the linear interpolation portion of the gamma-conversion circuit.

Figure 8:
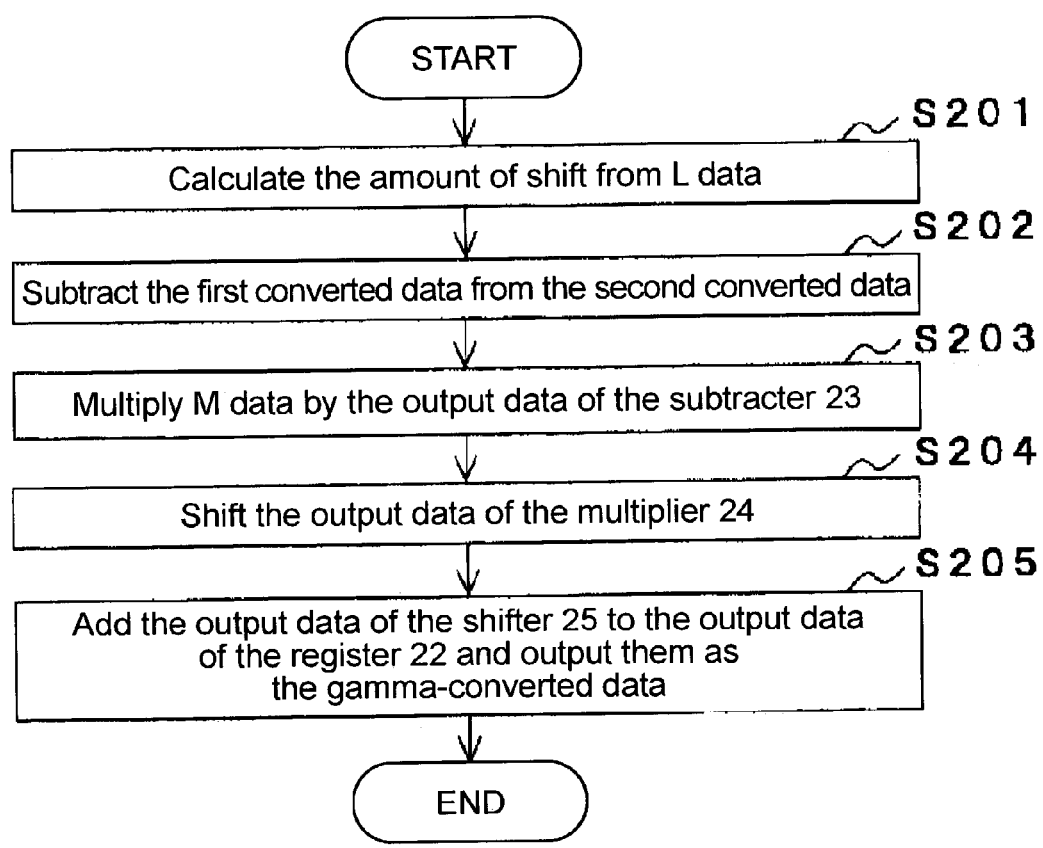
FIG. 8 shows a flow chart of linear interpolation processing of the gamma-conversion circuit related to the first embodiment of the present invention.

When the processing shown in FIG. 7 and FIG. 8 is started, the priority encoder 11 inputs the input data and outputs L data (step S101). Next, the bit-extracting portion 12 inputs the input data and the L data and outputs N data and M data (step S102). Next, the table address-forming portion 13 inputs the L data and the N data and outputs the first table address (step S103).

Next, the conversion-table storing portion 14 outputs the first converted data in repose to the first table address (step S104). The multiplexer 15 selects zero or the first converted data in response to a zero signal and outputs them, and these are read into the register 22 (step S105). Next, table address-forming portion 13 outputs the second table address obtained by incrementing (or decrementing) the first table address (step S106).

Next, the conversion-table storing portion 14 outputs the second converted data corresponding to the second table address (step S107). Next, multiplexer 15 selects 0 or the second converted data in response to the value of zero signal and outputs them (step S108). The linear interpolation portion 20 starts processing of linear interpolation based on the first converted data and the second converted data (step S109).

When processing of linear interpolation is started, the decoder 21 of the linear interpolation portion 20 calculates the amount of shift processed by the shifter 25 from L data (step S201). Next, the subtracter 23 subtracts the first converted data, which is output data of the register 22, from the second converted data, which is output data of the multiplexer 15 (step S202).

Next, the multiplier 24 multiplies M data by the output data of the subtracter 23 (step S203). Next, the shifter 25 shifts the output data of the multiplier 24 by the amount corresponding to the output data of the decoder 21 (step S204). Next, the adder 26 adds the output data of the shifter 25 to the first converted data which is the output data of the register 22 and outputs them as the gamma-converted data in response to input data (step S205).Thus, the gamma-conversion circuit 10 can output the output data (gamma-converted data) in response to input data.

Next, operation of the gamma-conversion circuit 10 will be described when "16' h0009" is input as the input data.

First, when the priority encoder 11 inputs the input data "16' h0009", it outputs the L data of "4' h3" to the bit-extracting portion 12, the table address-forming portion 13 and the decoder 21 and outputs a low level zero signal to the multiplexer 15.

When the bit-extracting portion 12 inputs L data "4' h3", it outputs "2' b00", which is the bit number 2 to 1 of the input data "16' h0009", to the table address-forming portion 13 as N data. Furthermore, the bit-extracting portion 12 outputs "16' h0001", where the bit number 0 of the input data of "16' h0009" is zero-expanded to 16 bits, to the multiplier 24 as M data. This M data "16' h0001" is equivalent to "$\Delta x$" in the formula (2).

When the table address-forming portion 13 inputs L data "4' h3" and N data "2' b00", it outputs "6' b001100", obtained by combining L data "4' h3" as a high order bit with N data "2' b00" as a low order bit, to the conversion-table storing portion 14 as the first table address.

Furthermore, the table address-forming portion 13 outputs "6' b001101", obtained by incrementing "6' b001100", to the conversion table forming portion 13 as the second table address after a predetermined time has elapsed.

When the conversion-table storing portion 14 inputs the first table address "6' b001100", it outputs the first converted data $y_{0008}$ corresponding to the first table address "6' b001100".

Furthermore, when the conversion-table storing portion 14 inputs the second table address "6' b001101" after a predetermined time has elapsed, it outputs the converted data $y_{000a}$ corresponding to the second table address "6' b001101".

The multiplexer 15 selects the first converted data y7, output by the conversion-table storing portion 14 and outputs them since the zero signal is at a low level.

Furthermore, the multiplexer 16 selects the second converted data y8, output by the conversion-table storing portion 14 and outputs them after a predetermined time has elapsed.

When the decoder 21 inputs the L data "4' h3", it outputs "4' h1", obtained by subtracting 2 from "4' h3", to the shifter 25. The "4' h1" power of 2 ($2^1$) is equivalent to "d" in the formula (2).

The register 22 maintains the first converted data y7, which is selected and output by the multiplexer 15, during a predetermined time. This first converted data y7 is equivalent to "$y_a$" in the formula (2).

The subtracter 23 subtracts the value of the first converted data y7 maintained by the register 22, from the second converted data y8 output by the multiplexer 15. This output data of the subtracter 23 is equivalent to "$\Delta y$" in the formula (2).

The multiplier 24 multiplies M data "16' h0001" by the data (y8−y7) output from the subtracter 23, and outputs them. Output data (here, (y8−y7)×1) of this multiplier 24 is equivalent to "$\Delta y \times \Delta x$" in the formula (2).

The shifter 25 shifts the output data (here, (y8−y7) x1) of the multiplier 24 to the right by 1 bit in response to "4' h1" of the decoder 21. Output data (y8−y7) x1/2) of this shifter 25 (here, is equivalent to "$\Delta y \times \Delta x \times 1/d$" in the formula (2).

The adder 26 adds the output data (here, (y8−y7) x1/2) of the shifter 25 to the first converted data y7 maintained by the register 22 and outputs them. The data output by this adder 26 is equivalent to "$y_a + \Delta y \times \Delta x \times 1/d$" in the formula (2).

Figure 9:
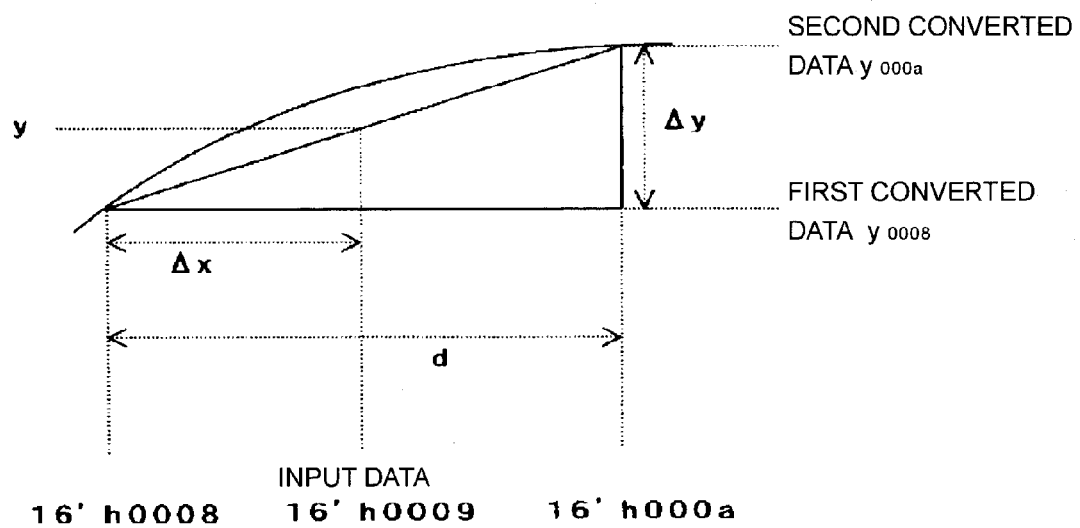
FIG. 9 shows the principle of calculation of the gamma-converted data corresponding to the input data "16'h0009" by linear-interpolation processing in the first embodiment of the present invention.

FIG. 9 shows a diagram of linear interpolation in this embodiment. Thus, the gamma-conversion circuit 10 can output the output data in response to the input data "16' h0009" (the gamma-converted data).

Figure 10:
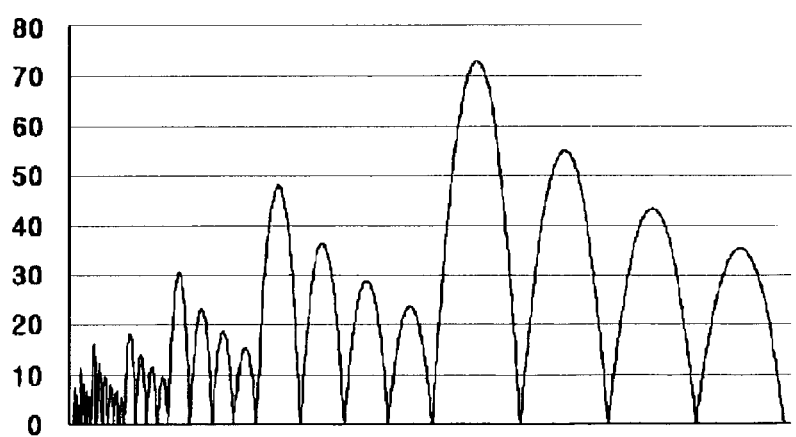
FIG. 10 shows trends of the output data of the gamma-conversion circuit related to the first embodiment of the present invention.

Next, errors between the output data from the gamma-conversion circuit 10 and the values calculated by the formula (1) will be described with reference to FIG. 10. FIG. 10 shows a diagram of errors between the output data from the gamma-conversion circuit 10 and the values calculated by formula (1). As shown in FIG. 10, the maximum error between the output data from the gamma-conversion circuit 10 and the values calculated by formula (1) is about 73 which is about one-1.78th (56%) of the error (about 130) of the gamma-conversion circuit 80 shown in FIG. 29.

Thus, the memory capacity of conversion-table storing portion 14 can be made small according to the present embodiment. According to the present embodiment, the memory capacity of the conversion-table storing portion 14 is 59 words, which can be reduced to be about one-1110th (0.09%) of the memory capacity of the conversion-table storing portion 71 of the gamma-conversion circuit 70 (65536 words) and reduced to be about one-69th (1.44%)of the memory capacity of the conversion-table storing portion 81 of the gamma-conversion circuit 80 (4096 word). Further, according to the present embodiment, the error of output data can be reduced to be one-1.78th (56%) of the error of the gamma-conversion circuit 80.

Here, the gamma-conversion circuit 10 can be composed by a CPU and a program. In such case, a cache memory built-in in a CPU becomes conversion-table storing portion 14 so that the conversion table can be memorized in a cache memory, since the size of the conversion table shown in FIG.

3 to FIG. 5 is small with 59 words. Hence, high-speed gamma-conversion can be attained.

In addition, in the present embodiment, the bit-extracting portion 12 extracts 2 bits of the bit numbers (L-1) to (L-2) of the input data as the N data. But, 3 bits of the bit numbers (L-1) to (L-3) of the input data may be extracted as the N data, or 4 bits of the bit numbers (L-1) to (L-4) of the input data may be extracted as the N data. Hence, the error of the output data can be further reduced by increasing a bit width of the N data. In addition, in the present embodiment, the input data have a 16-bits width and the output data have a 12-bits width, but these data may have other bit widths.

Next, a method of forming the conversion table used in the present embodiment will be described. At the time of forming the gamma-conversion table, the value of converted data can be calculated, if the value of gamma is predetermined in the formula (1). Further, the characteristic of γ correction may be predetermined by a linear table (for example, a table of 256 words when input data is 8 bits) storing the output corresponding to the input data of equivalent periods, instead of γ value. In such case, values of γ must be predetermined from the linear table once, or values of γ must be predetermined in the beginning by changing the software system. Hence, there was a problem in that the work for system development has to be increased. However, according to the following method, the conversion table used in the present embodiment may be readily formed based on the conventional linear table.

This method of forming the conversion table uses the following principle.

When $x=2^{-A}B$ can expressed, $$y(x)=x^{1/\gamma}=(2^{-A}B)^{1/\gamma}=2^{-A/\gamma}B^{1/\gamma}=(2^{-A})^{1/\gamma}B^{1/\gamma}\gamma=y(2^{-A})y(B)$$

Namely, the value of gamma conversion $x=2^{-A}B$ can be expressed as a product of the gamma converted value of $2^{-A}$ with the gamma converted value of $B^{1/\gamma}$.

The following operation is completed to obtain values of data stored in the conversion table used in the present embodiment.

Within the range where data of the conventional linear table can be employed, those data are used just as these are.

Within the range where data of the conventional linear table can not be employed, firstly, data having bit numbers equivalent to that of input data is disassembled into two sections so that these are expressed in the form of $2^{-A}B$ by using natural numbers A and real numbers B. Next, two converted data $2^{-A/\gamma}$ and $B^{1/\gamma}$ of which one corresponds to each of two sections $2^{-A}$ and B are read from the conventional linear table. Furthermore, converted data $(2^{-A}B)^{1/\gamma}$ which are expressed as the form of $2^{-A}B$ are obtained by multiplying two converted data. Hence, the converted data, which should be stored in the conversion table can be obtained by repeating these operations for plural data.

An example of forming the conversion table will be explained when the input data is 16 bits, based on the linear table of 256 words corresponding to the 8-bits input data.

For example, when the input data is (0,0,1,0,1,0,0,0,0,0,0,0,0,0,0,0), it is enough that the converted value corresponding to the address (0,0,1,0,1,0,0,0) in the 8-bits linear table is read.

On the other hand, in case when the input data is less than (0,0,0,0,0,0,0,0,1,1,0,0,0,0,0,0), the converted value cannot be read from the 8-bits linear table. Hence, the follwing relationship is used, when the input data is smaller than (0,0,0,0,0,0,1,0,0,0,0,0,0,0,0,0).

$x=(0,0,0,0,0,0, x_9, x_8, x_7, 0,0,0,0,0,0,0)$ is expressed as the product of $B=(x_9, x_8, x_7, 0,0,0,0,0,0,0,0,0,0,0,0,0)$ with $2^{-6}=(0,0,0,0,0,1,0,0,0,0,0,0,0,0,0,0)$, (here A=6). Then, $y(x)=y(0,0,0,0,0,1,0,0,0,0,0,0,0,0,0,0)y(x_9, x_8, x_7, 0,0,0,0,0,0,0,0,0,0,0)$.

In this formula, the converted data with regard to two sections on the right-hand side can be read from the conventional linear table.

Generally, the input values within the range of $2^{-i} \leq x < 2^{-(i-1)}$ are the following:

(1) $2^{-i}$
(2) $2^{-i}+1 \times 2^{-(i+2)}$
(3) $2^{-i}+2 \times 2^{-(i+2)}=2^{-i}+2^{-(i+1)}$
(4) $2^{-i}+3 \times 2^{-(i+2)}=2^{-i}+2^{-(i+1)}+2^{-(i+2)}$ Such input values are enumerated from larger one as the following:

When the most significant bit is the first "1",
(1,1,1,0,0,0,0,0,0,0,0,0,0,0,0)
(1,1,0,0,0,0,0,0,0,0,0,0,0,0,0,0)
(1,0,1,0,0,0,0,0,0,0,0,0,0,0,0,0)
(1,0,0,0,0,0,0,0,0,0,0,0,0,0,0,0).

When the second bit from high order bit is the first "1",
(0,1,1,1,0,0,0,0,0,0,0,0,0,0,0,0)
(0,1,1,0,0,0,0,0,0,0,0,0,0,0,0,0)
(0,1,0,1,0,0,0,0,0,0,0,0,0,0,0,0)
(0,1,0,0,0,0,0,0,0,0,0,0,0,0,0,0).

When the 14th bit from high order bit is the first "1",
(0,0,0,0,0,0,0,0,0,0,0,0,0,1,1,1)
(0,0,0,0,0,0,0,0,0,0,0,0,0,1,1,0)
(0,0,0,0,0,0,0,0,0,0,0,0,0,1,0,1)
(0,0,0,0,0,0,0,0,0,0,0,0,0,1,0,0).

When the 15th bit from high order bit is the first "1",
(0,0,0,0,0,0,0,0,0,0,0,0,0,0,1,1)
(0,0,0,0,0,0,0,0,0,0,0,0,0,0,1,0).

When the least significant bit is the first "1",
(0,0,0,0,0,0,0,0,0,0,0,0,0,0,0,1).

When all bits are "0"
(0,0,0,0,0,0,0,0,0,0,0,0,0,0,0,0).

Thus, the input value is determined by the position of "1" of the most significant bit and the following 2 bits. Here, as described above, the data {L,N}, where 4-bits of data L indicating the most significant bit of "1" in the input value is combined with the following 2-bits of data N, can be used as address. Here, when the input value "0" is not stored in the conversion table, the converted value is certainly "0". Further, when the input value is 1, the converted value is also "1".

In this example, the range of $2^{-6}>x \geq 2^{-12}$ is obtained as A=6, after having read the value of the 8-bits linear table about the range of $1>x \geq 2^{-6}$. Then, the range of $2^{-12}>x \geq 2^{-18}$ can be obtained as A=12. Hence, high-speed calculation can be attained by using a personal computer since a converted value can be obtained only by simple calculation such as multiplication and others. Further, it is not necessary to change the software system.

Figure 11:
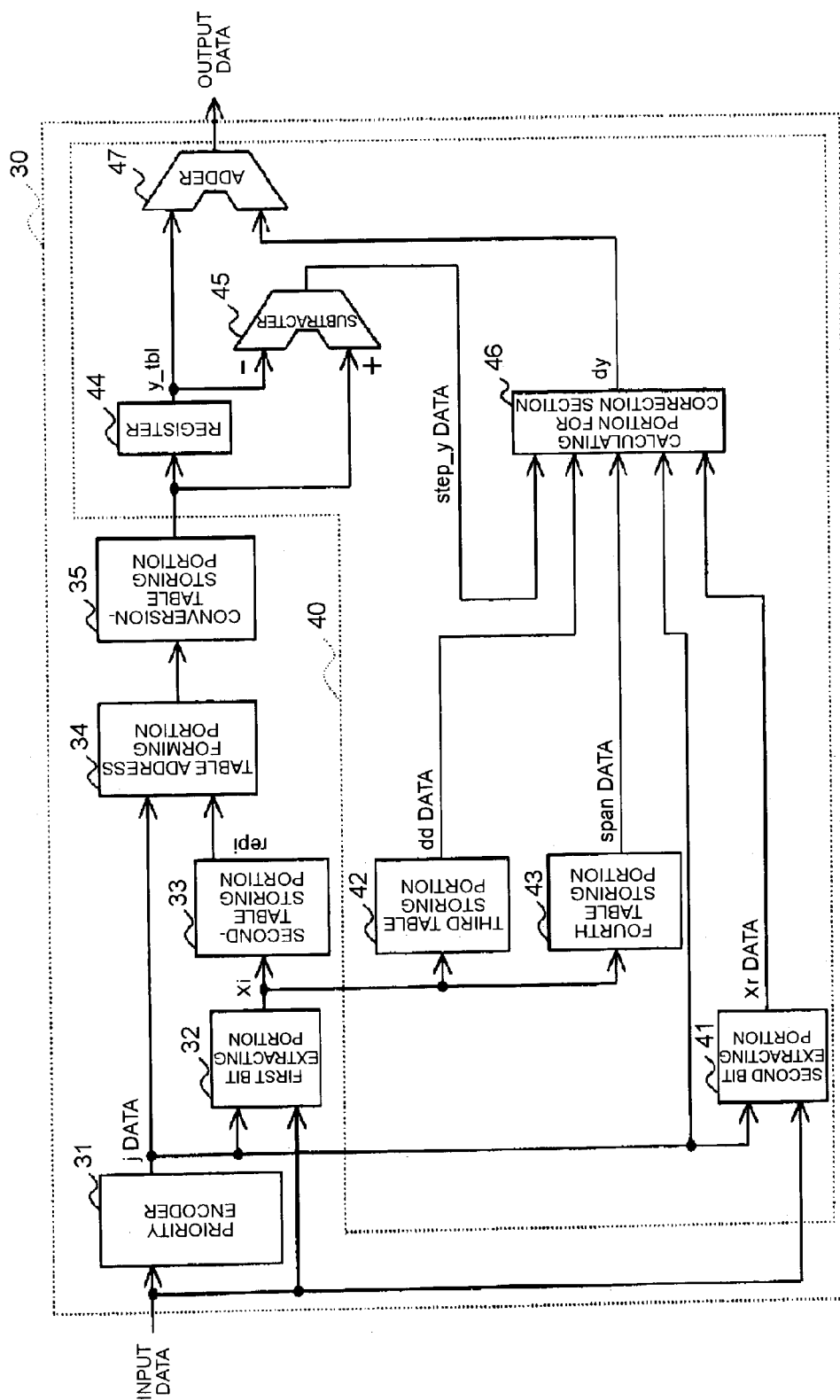
FIG. 11 shows the constitution of a gamma-conversion circuit related to a second embodiment of the present invention.

Next, a second embodiment of the present invention will be explained hereafter. FIG. 11 shows a diagram of a data conversion circuit related to the second embodiment of the present invention. In the present embodiment, a gamma-conversion circuit is applied to the present invention. Further, in the present embodiment, the input data have 16-bits width, and the output data have 12 bits width.

In FIG. 11, a gamma-conversion circuit 30 comprises a priority encoder 31, a first bit-extracting portion 32, a second table-storing portion 33, a table address-forming portion 34, a conversion-table storing portion 35 and a linear-interpolation portion 40.

In addition, a linear-interpolation portion 40 includes a second bit-extracting portion 41, a third table-storing portion 42, a fourth table-storing portion 42, a register 44, a subtracter 45, a calculating portion 46 for a correction section and an adder 47.

A priority encoder 31 inputs the input data of a 16-bits width, detects "1" bit located at the most significant bit within the input data and outputs the bit number of the detected bit as j data of a 4-bits width.

The first bit-extracting portion 32 inputs the input data and the j data, extracts 4 bits of bit numbers (j-1) to (j-4) and outputs such extracted 4 bits as $x_i$ data.

The second table-storing portion 33 stores the table converting the 4-bits xi data into repi data of a 2 bits width. When the $x_i$ data is "4' h0" to "4' h2", it outputs "2' b00" as the repi data. When the $x_i$ data is "4' h3" to "4' h6", it outputs "2' b01" as the repi data. When the $x_i$ data is "4' h7" to "4' ha", it outputs "2' b10" as the repi data. When the $x_i$ data is "4' hb" to "4' hf, " it outputs "2' b11" as the repi data.

Table address-forming portion 34 inputs j data of a 4-bits width and the repi data of a 2-bits width and outputs the first table address of 6 bits obtained by combining the j data as a high order bit with the repi data as a low order bit. Then, it outputs the second table address obtained by incrementing (or decrementing) the data, which is obtained by combining the j data with the repi data after a predetermined time has elapsed.

The conversion-table storing portion 35 stores the conversion table making converted data, obtained by gamma-converting the input data of a 12 bits width, to correspond with the table address. It outputs the first and the second converted data in response to the first and the second table address.

The linear interpolation portion 40 applies linear-interpolation to the first and the second converted data output by the conversion-table storing portion 35.

The second bit-extracting portion 41 inputs the input data and the j data, extracts the (j-4) bit of the bit numbers (j-5) to 0 in the input data and outputs such extracted data as $x_r$ data.

The third table-storing portion 42 stores the table converting the xi data into predetermined data (dd data). When the xi data is "4' h0", it outputs "0" as the dd data. When the $x_i$ data is "4' h1", it outputs "1" as the dd data. When the $x_i$ data is "4' h2", it outputs "2" as the dd data. When the $x_i$ data is "4' h3", it outputs "0" as the dd data. Further, when the $x_i$ data is "4' h4", the third table-storing portion 42 outputs "1" as the dd data. When the $x_i$ data is "4' h5", it outputs "2" as the dd data. When the $x_i$ data is "4' h6", it outputs "3" as the dd data. When the $x_i$ data is "4' h7", it outputs "0" as the dd data.

Further, when the $x_i$ data is "4' h8", the third table-storing portion 42 outputs "1" as the dd data. When the $x_i$ data is "4' h9", it outputs "2" as the dd data. When the $x_i$ data is "4' ha", it outputs "3" as the dd data. When the $x_i$ data is "4' hb", it outputs "0" as the dd data. Further, when the $x_i$ data is "4' hc", the third table-storing portion 42 outputs "1" as the dd data. when the $x_i$ data is "4' hd", it outputs "2" as the dd data. When the $x_i$ data is "4' he", it outputs "3" as the dd data. When the $x_i$ data is "4' hf", it outputs "4" as the dd data.

The fourth table-storing portion 43 stores the table converting the xi data into predetermined data (span data). When the $x_i$ data is "4' h0" to "4' h2", it outputs "3" as the span data. When the $x_i$ data is "4' h3" to "4' ha", it outputs "4" as the span data. When the $x_i$ data is "4' hb" to "4' hf", it outputs "5" as the span data.

FIG. 12 shows the relationship among the input data, the range obtained by dividing the input data into a predetermined width, the j data, the dd data, the span data, the repi data, the table address and the converted data. In FIG. 12, $y_{1000}$ is the data of a 12-bits width, obtained by gamma-converting the input data "16' h1000", $y_{1300}$ is the data of a 12-bits width, obtained by gamma-converting the input data "16' h1300", $y_{1700}$ is the data of a 12-bits width, obtained by gamma-converting the input data "16' h1700", $y_{1b00}$ is the data of a 12-bits width, obtained by gamma-converting the input data "16' h1b00", $y_{2000}$ is the data of a 12-bits width, obtained by gamma-converting the input data "16' h2000".

As shown in FIG. 2, for example, in the case of input data: "16' h1000", the table address becomes "6' b110000," and in the case of input data: "16' h1100," the table address also becomes "6' b110000". In this case, the conversion-table storing portion 35 stores the converted data $y_{1000}$, obtained by gamma-converting the input data "16' h1000", while making them correspond with the table address "6' b110000" and does not store the converted data obtained by gamma-converting the input data "16' h1100".

Hence, when the same table addresses are generated from plural input data, the conversion-table storing portion 35 stores only the converted data obtained by gamma-converting the minimum input data within the plural input data, while making them correspond with the table addresses generated from the plural input data.

Here, as shown in FIG. 12, in the range of the input data "16' h1000" to "16' h2000", the conversion-table storing portion 35 stores the converted data $y_{1000}$, which corresponds to the input data "16' h1000", and the converted data; $y_{1300}$, $y_{1700}$ and $y_{1b00}$, which correspond to the input data "16' h1300", "16' h1700" and "16' h1b00" respectively, dividing the range of 16' h1000" to "16' h2000" into 3:4:4:5.

Here, when the range of the input data: "16' h1000" to "16' h1300" is rep0, the range of the input data: "16' h1300" to "16' h1700" is rep1, the range of the input data: "16' h1700" to "16' h1b00" is rep2, and the range of the input data: "16' h1b00" to "16' h2000" is rep3, the repi data indicate a rep number to which the input data belongs.

Further, the span data is the ratio of the range, to which the input data belong, with the other three ranges. For example, when the input data is "16' h1001", the span data is "3" that is the ratio of the rep0, the range to which the input data belongs, with the rep1 to rep3.

Referring to FIG. 11 again, a register 44 maintains the output data of the conversion-table storing portion 35 during a predetermined time, and outputs the maintained data as "y_tbl" data. A subtracter 45 outputs the data, which is obtained by subtracting the output data of the register 44 from the output data of the conversion-table storing portion 35, as step_y data.

A calculating portion for correction section 46 inputs the dd data, the span data, the j data, $x_r$ data and the step_y data and calculates dy data by the formula below. Then, an adder 47 adds the dy data to the y_tbl data and outputs them.

Equation 3

$$dy = \text{step\_y} \cdot \frac{dd \cdot 2^{(j-4)} + x_r}{span \cdot 2^{(j-4)}} \tag{3}$$

Figure 13:
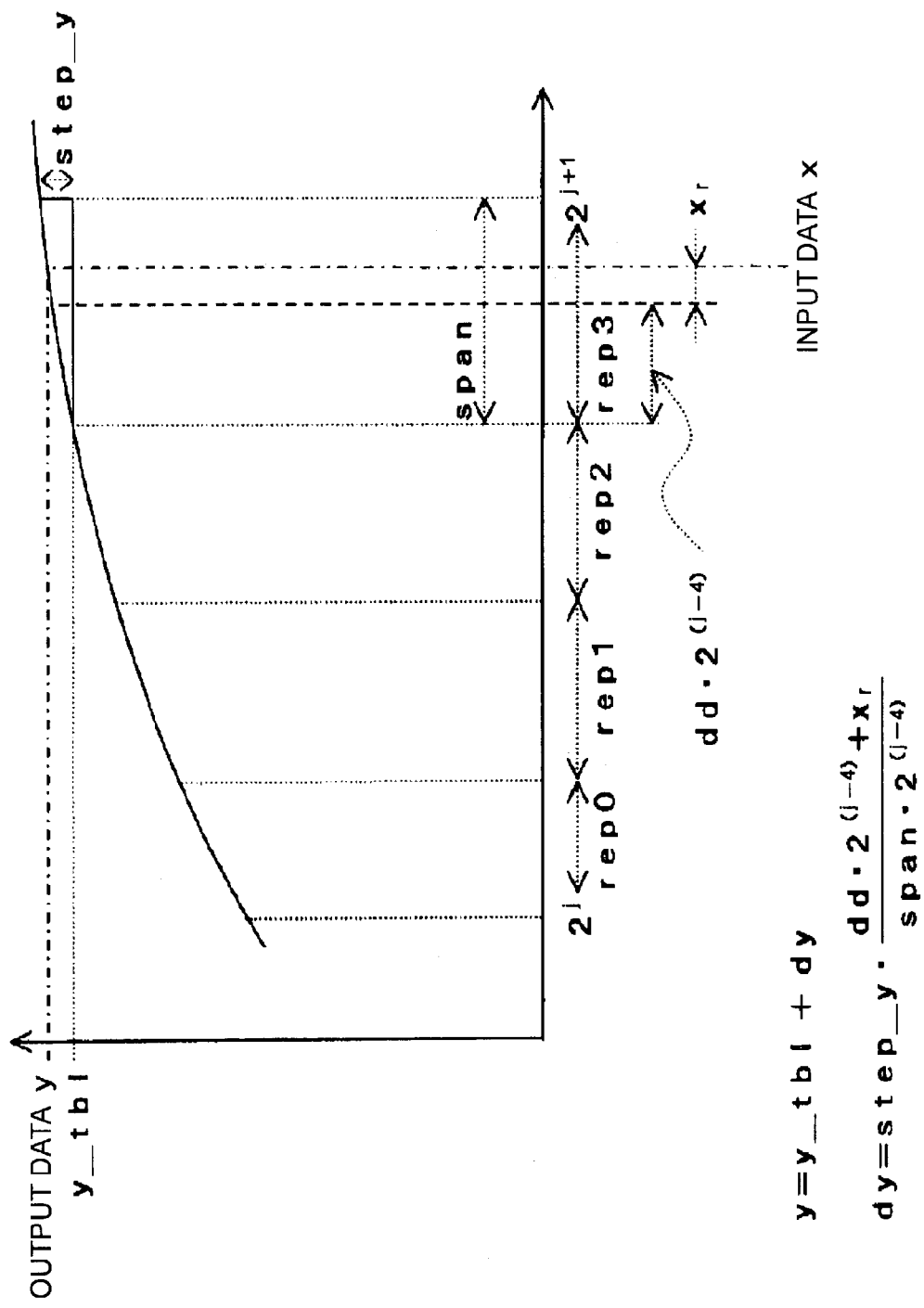
FIG. 13 shows a principle of linear-interpolation processing in the second embodiment of the present invention.

Next, linear-interpolation processing by the linear-interpolation portion 40 will be described with reference to FIG. 13. FIG. 13 shows a principle of the linear-interpolation processed by the linear-interpolation portion 40. As shown in FIG. 13, the linear interpolation portion 40 can calculate the converted data y corresponding to the input data x by the following expression.

Equation 4

$$y = y\_tbl + dy \quad (4)$$

Figure 14:
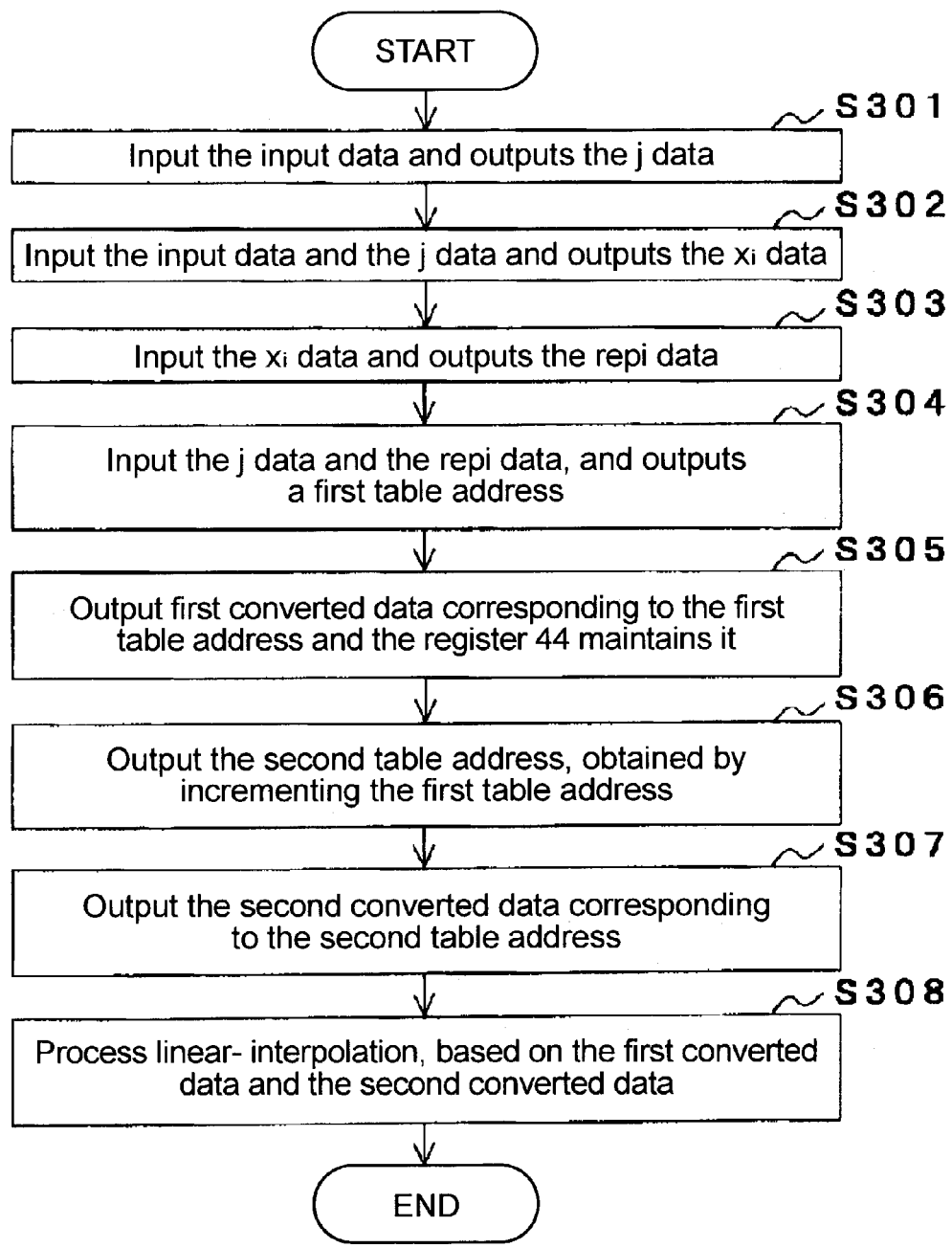
FIG. 14 shows a flow chart of operation of the gamma-conversion circuit related to the second embodiment of the present invention.
Figure 15:
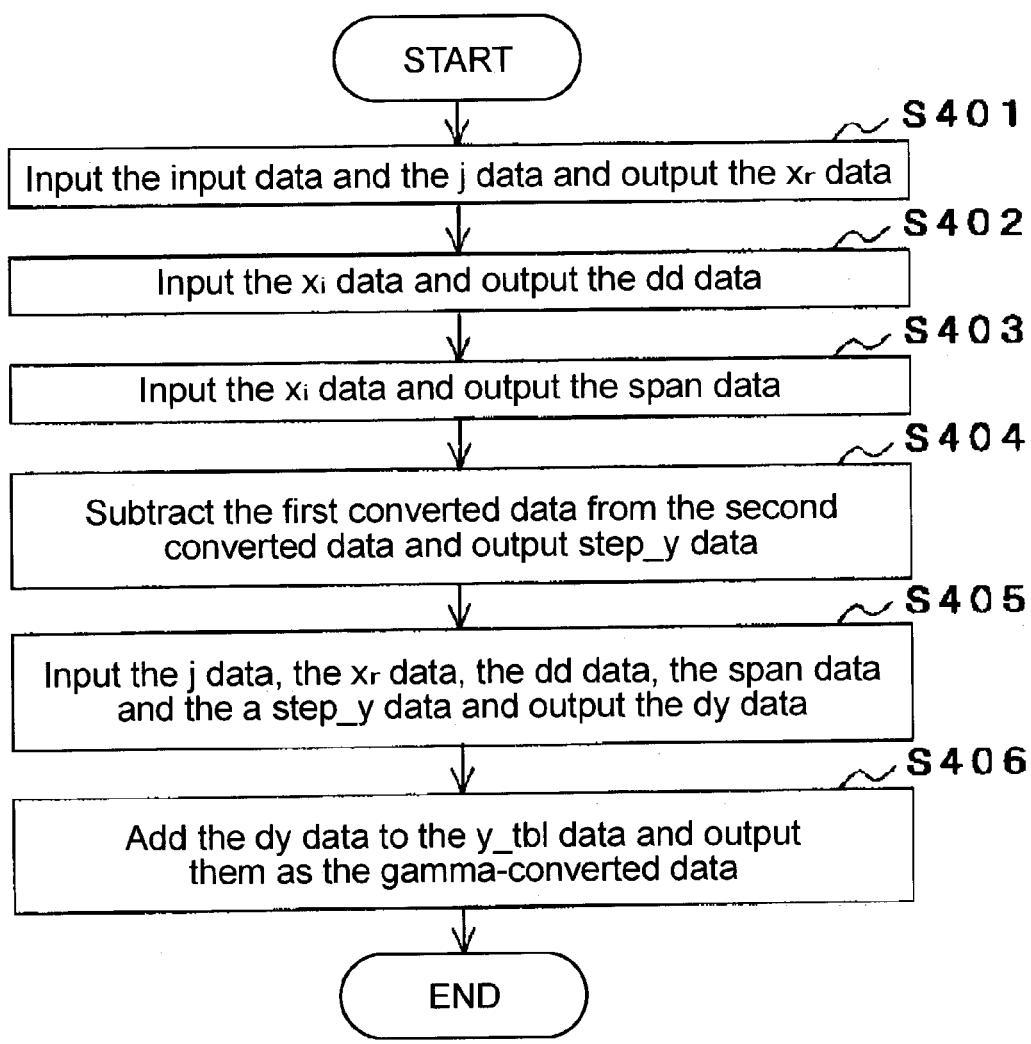
FIG. 15 shows a flow chart of linear-interpolation processing of the gamma-conversion circuit related to the second embodiment of the present invention.

Next, gamma-transformation processing of the gamma-conversion circuit will be described with reference to FIG. 11, FIG. 14 and FIG. 15. FIG. 14 shows a flow chart of gamma transform processed by the gamma-conversion circuit. FIG. 15 shows a flow chart of linear-interpolation process by the linear-interpolation portion of the gamma-conversion circuit.

If processing in FIG. 14 and FIG. 15 is started, the priority encoder 31 inputs the input data and outputs the j data (step S301). Next, the first bit-extracting portion 32 inputs the input data and the j data and outputs the $x_i$ data (step S302). Next, the second table-storing portion 33 inputs the $x_i$ data and outputs the repi data (step S303). Next, the table address-forming portion 34 inputs the j data and the repi data, outputs the first table address (step S304).

Next, the conversion-table storing portion 35 outputs the first converted data corresponding to the first table address and the register 44 maintains it (step S305). Next, the table address-forming portion 34 outputs the second table address, which is obtained by incrementing (or decrementing) the first table address (step S306). Next, the conversion-table storing portion 35 outputs the second converted data corresponding to the second table address (step S307). Next, the linear-interpolation portion 40 starts processing linear-interpolation, based on the first converted data and the second converted data (step S308).

When the linear-interpolation process is started, the second bit-extracting portion 41 of the linear interpolation portion 40 inputs the input data and the j data and outputs the $x_r$ data (step S401). Next, the third table-storing portion 42 inputs the xi data and outputs the dd data (step S402). Next, the fourth table-storing portion 42 inputs the $x_i$ data and outputs the span data (step S403). Next, the subtracter 45 subtracts the first converted data, which is the output data of the register 44, from the second converted data, which is the output data of the conversion-table storing portion 35 (step S404).

Next, the calculation portion for correction section 46 inputs the j data, the $x_r$ data, the dd data, the span data and the step_y data and outputs the dy data (step S405). Next, the adder 47 adds the dy data to the y_tbl data and outputs them as the gamma-converted data corresponding to the input data (step S406). Thus, the gamma-conversion circuit 30 can output the output data (gamma-converted data) corresponding to the input data.

Figure 16:
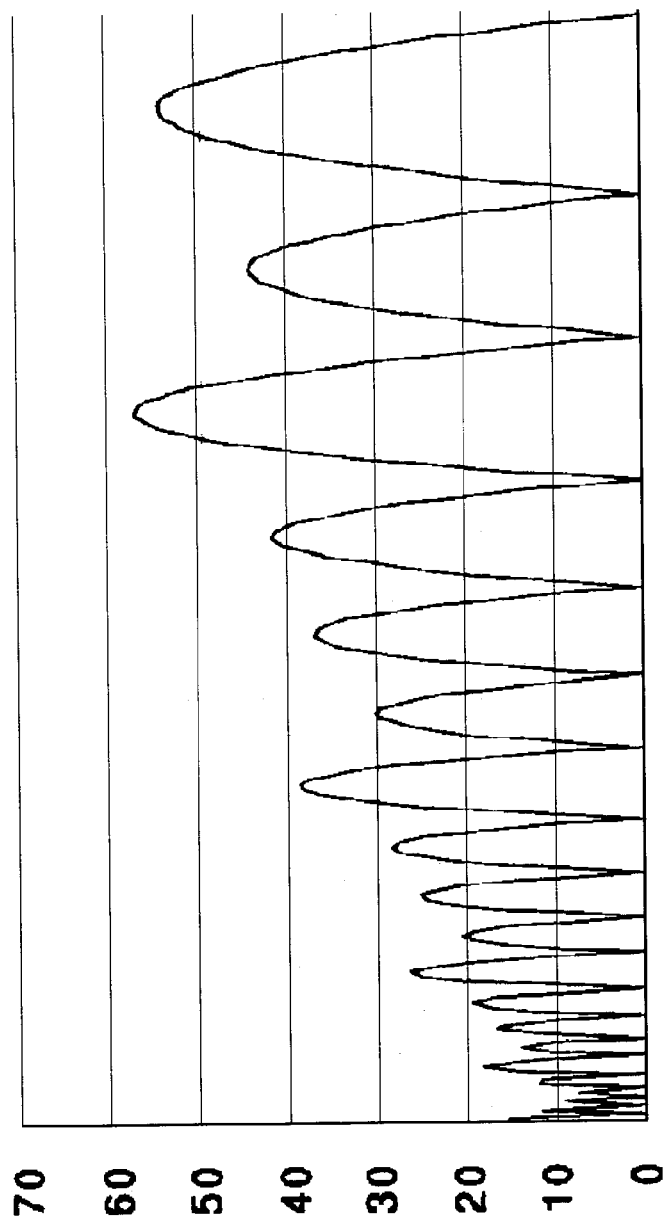
FIG. 16 shows trends of the output data of the gamma-conversion circuit related to the second embodiment of the present invention.

Next, errors between the output data of the gamma-conversion circuit 30 and the formula (1) will be explained with reference to FIG. 16. FIG. 16 shows a diagram of errors between the output data of the gamma-conversion circuit 30 and the formula (1). As shown in FIG. 16, the maximum error between the output data of the gamma-conversion circuit 30 and the formula (1) is about 58, which is about one 2.24th (44%) of the error (about 130) of the gamma-conversion circuit 80 shown in FIG. 29 and about one 1.25th (79%) of the error (about 73) of the gamma-conversion circuit 10 shown in FIG. 10.

Hence, according to the present embodiment, error can be made smaller than that of the gamma-conversion circuit 10, while the size of the conversion table that is stored by the conversion-table storing portion 35 is maintained the same size as the conversion table that is stored by the conversion-table storing portion 14 of the gamma-conversion circuit 10, in other words, the memory capacity of the conversion-table storing portion 35 is maintained as the same memory capacity of the conversion-table storing portion 14.

Here, the gamma-conversion circuit 30 can be composed of a CPU and a program. In such case, a cache memory built-in in a CPU becomes the conversion-table storing portion 35 so that the conversion table can be memorized in a cache memory, since the size of the conversion table is small.

Hence, high-speed gamma-conversion can be attained.

In addition, in the present embodiment, the first bit-extracting portion 32 extracts 4 bits of bit numbers (L-1) to (L-4) of the input data as the $x_i$ data. But, 3 bits of the bit numbers (L-1) to (L-3) of the input data may be extracted as the $x_i$ data, or 5 bits of the bit numbers (L-1) to (L-5) of the input data may be extracted as $x_i$ data. Hence, the error of the output data can be further reduced by increasing a bit width of the $x_i$ data.

Further, in the present embodiment, the input data have 16-bits width and the output data have 12-bits width, but these data may have other bit widths. Also, in the present embodiment, the second table-storing portion 32 is used for outputting the repi data based on the j data. But a decoder may be used instead of the second table-storing portion 32. Similarly, a decoder may be used instead of the third table-storing portion 42 and the fourth table-storing portion 43.

Figure 17:
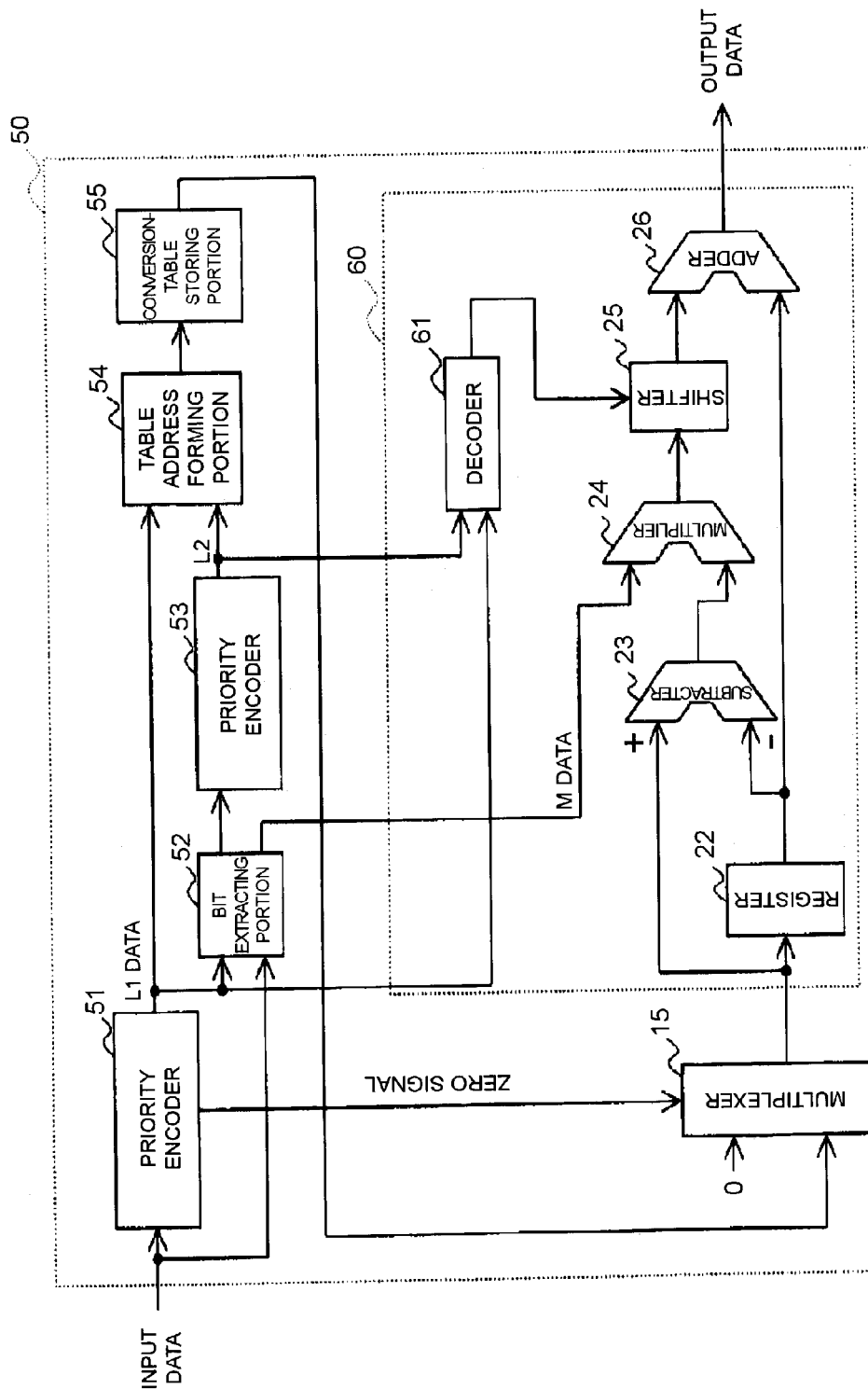
FIG. 17 shows a constitution of the gamma-conversion circuit related to a third embodiment of the present invention.

Next, a third embodiment of the present invention will be explained hereafter. FIG. 17 shows diagram of a data conversion circuit related to the third embodiment of the present invention. In the present embodiment, a gamma-conversion circuit is applied to the present invention. Further, in the present embodiment, the input data have 16-bits width, and the output data have 12 bits width.

In FIG. 17, a gamma-conversion circuit 50 comprises a priority encoder 51, a bit-extracting portion 52, a table address-forming portion 54, a conversion-table storing portion 55, the multiplexer 15 and a linear-interpolation portion 60. In addition, the linear-interpolation portion 60 includes a decoder 61, the register 22, the subtracter 23, the multiplier 24, the shifter 25 and the adder 26.

The priority encoder 51 inputs the input data of a 16-bits width, detects bits of "1" located at the most significant bit within the input data and outputs a bit number of the detected bit as L1 data of a 4-bits width. Further, in the absence of bits of "1" in the input data, namely in the case of "16' h0000", the priority encoder 51 outputs "4' h0" of L data and also a high level zero signal.

The bit-extracting portion 52 inputs the input data and the L1 data, extracts 3 bits of the bit numbers (L1-1) to (L1-3) and outputs them. Further, when the value of L1 data is smaller than "4' h3", the bit-extracting portion 52 extracts the bit numbers (L1-1) to 0 and then the 3-bits data which is obtained by combining the predetermined "0" with a low order bit. For example, when the input data is "16' h0003" and the L1 data is "4' h1", the bit-extracting portion 52 outputs "3' b100" which is obtained by combining "00" with the low-order bit of "1" that is the bit number 0 of the input data "16' h0003".

The priority encoder 53 inputs the data of a 3-bits width from the bit-extracting portion 52, detects "1" bit located at the most significant bit in the input data, and outputs the bit number of the detected bit as the L2 data of a 2-bits width. The table address-forming portion 53 inputs the L1 data of a 4-bits width and the L2 data of a 2-bits width, and outputs a first table address of 6 bits, which is obtained by combining the L1 data as a high order bit with the L2 data as a low order bit. Then, it outputs a second table address, which is obtained by incrementing (or decrementing) data where L1 data is combined with L2 data.

The conversion-table storing portion 55 stores the conversion table making converted data, obtained by gamma-converting the input data of a 16 bits width, to correspond with the table address. It outputs the first and the second converted data in response to the first and the second table address.

FIG. 18 shows the relationship among the input data, the L1 data, the L2 data, the table address, the increment of the input data and the converted data. In FIG. 18, $y_{0001}$ is the data of a 12-bits width, obtained by gamma-converting the input data "16' h0001", $y_{0002}$ is the data of a 12-bits width, obtained by gamma-converting the input data "16' h0002", $y_{0003}$ is the data of a 12-bits width, obtained by gamma-converting the input data "16' h0003", $y_{0004}$ is the data of a 12-bits width, obtained by gamma-converting the input data "16' h0004". Here, $y_{0005}$ is the data of a 12-bits width, obtained by gamma-converting the input data "16' h0005", $y_{0006}$ is the data of a 12-bits width, obtained by gamma-converting the input data "16' h0006", $y_{0007}$ is the data of a 12-bits width, obtained by gamma-converting the input data "16' h0007", $y_{0008}$ is the data of a 12-bits width, obtained by gamma-converting the input data "16' h0008".

Further, $y_{0009}$ is the data of a 12-bits width, obtained by gamma-converting the input data "16' h0009", $y_{0003}$ is the data of a 12-bits width, obtained by gamma-converting the input data "16' h000a", $y_{000c}$ is the data of a 12-bits width, obtained by gamma-converting the input data "16' h000c", $y_{0010}$ is the data of a 12-bits width, obtained by gamma-converting the input data "16' h0010", $y_{c000}$ is the data of a 12-bits width, obtained by gamma-converting the input data "16' hc000".

As shown in FIG. 18, for example, when the input data is "16' h000a", the table address becomes "6' b001110". When the input data is "16' h000b", the table address also becomes "6' b001110". In this case, the conversion-table storing portion 55 stores the converted data $y_{000a}$, obtained by gamma-converting the input data "16' h000a", while making them correspond with the table address "6' b001100" and does not store the converted data obtained by gamma-converting the input data "16' h000b". Hence, when the same table addresses are generated by plural input data, the conversion-table storing portion 55 stores only the converted data obtained by gamma-converting the minimum input data within the plural input data, while making them correspond with the table addresses generated from the plural input data.

FIGS. 19 to 21 show the relationship among the input data, the table address and the converted data. In FIG. 19 to FIG. 21, the input data corresponding to converted data, which is not stored in the conversion-table storing portion 55, is not shown. As shown in FIG. 19 to FIG. 21, the converted data become 59 data from $y_{0001}$ to $y_{c000}$ in response to the input data (in the present embodiment, data vary by combinations of 65536 from "16' h0000" to "16' hffff"). Therefore, the conversion-table storing portion 55 may have a memory capacity of 59 words (here, a single word=12 bits).

Referring to FIG. 9 again, the linear-interpolation portion 60 applies linear interpolation to the first and second converted data output by the conversion-table storing portion 55.

When the L2 data is "2' b00", the decoder 61 outputs (L1−3) and when the L2 data is "2' b01", "2' b10" or "2' b111", it outputs (L1+L2−4).

Figure 22:
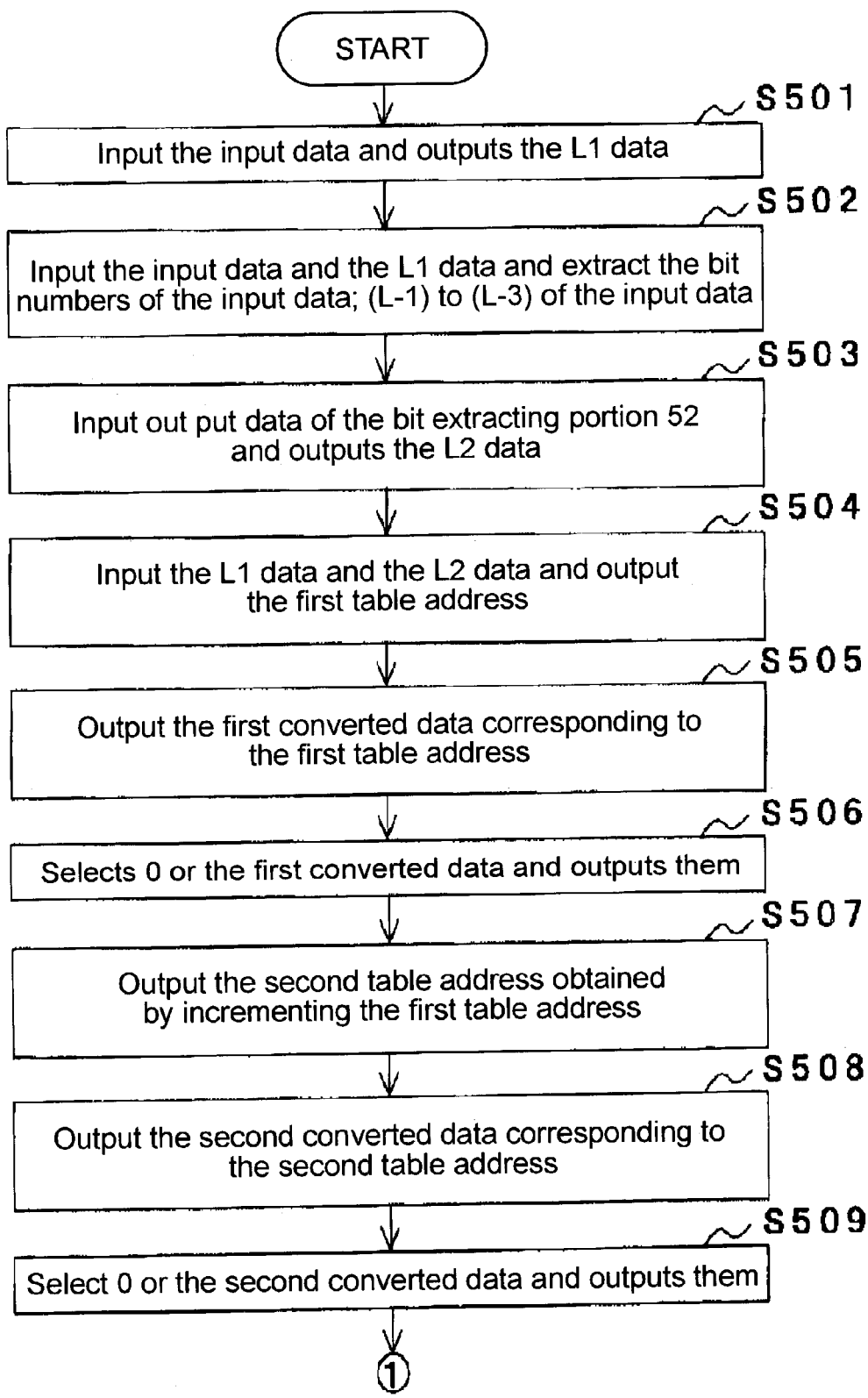
FIG. 22 shows a flow chart of operation of the gamma-conversion circuit related to the third embodiment of the present invention.
Figure 23:
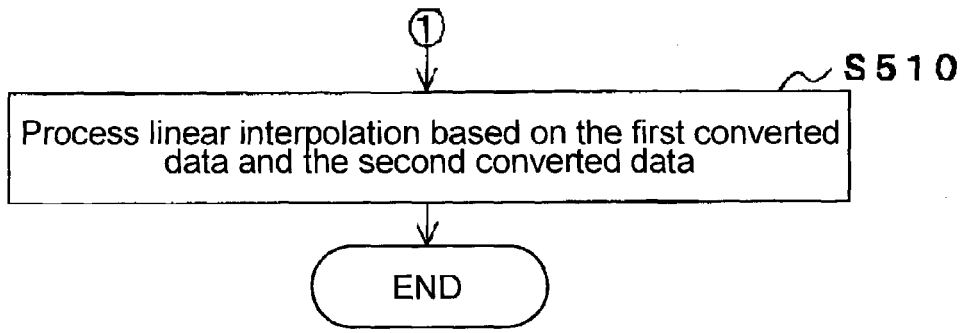
FIG. 23 shows a flow chart of operation of the gamma-conversion circuit related to the third embodiment of the present invention.
Figure 24:
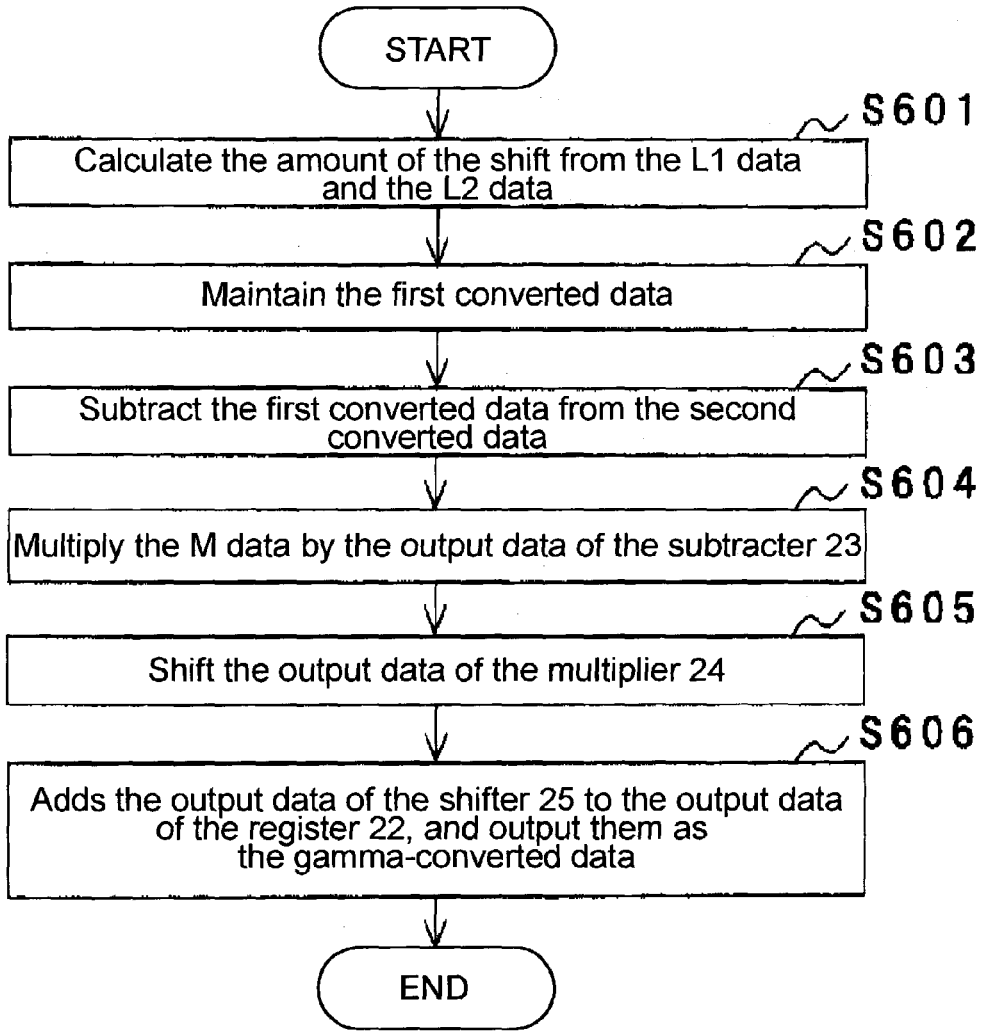
FIG. 24 shows a flow chart of linear-interpolation processing of the gamma-conversion circuit related to the third embodiment of the present invention.

Next, gamma transform processing of the gamma-conversion circuit will be described with reference to FIG. 17 and FIG. 22 to FIG. 24. FIGS. 22 to FIG. 23 show a flow chart of gamma transformation processing of the gamma-conversion circuit. FIG. 24 shows a flow chart of linear-interpolation processing of the linear interpolation portion in the gamma-conversion circuit.

When processing in FIG. 22 to FIG. 24 is started, the priority encoder 51 inputs the input data and outputs the L1 data (step S501). Next, the bit-extracting portion 52 inputs the input data and the L1 data and outputs 3-bits data of the bit numbers of the input data (L-1) to (L-3) and the M data (step S502). Next, the priority encoder 53 inputs the 3-bits data of the bit numbers (L-1) to (L-3) of the input data and outputs the L2 data (step S503). Next, the table address-forming portion 13 inputs the L1 data and the L2 data and outputs the first table address (step S504).

Next, the conversion-table storing portion 55 outputs the first converted data corresponding to the first table address (step S505). Next, the multiplexer 15 selects 0 or the first converted data in response to a zero signal value and outputs them (step S506). Next, the table address-forming portion 54 outputs the second table address which is obtained by incrementing (or decrementing) the first table address (step S507).

The conversion-table storing portion 55 outputs the second converted data corresponding to the second table address (step S508). The multiplexer 15 selects 0 or the second converted data, and outputs 0 or the second converted data corresponding to the value of a zero signal (step S509). Next, the linear-interpolation portion 60 starts to process linear interpolation based on the first converted data and the second converted data (step S510).

When linear interpolation processing is started, the decoder 61 of the linear interpolation portion 60 calculates the amount of the shift processed by the shifter 25 from the L1 data and the L2 data (step S601). Next, the register 22 maintains the first converted data during a predetermined time (step S602). Next, the subtracter 23 subtracts the first converted data, which is the output data of the register 22, from the second converted data, which is the output data of the multiplexer 15 (step S603).

Next, the multiplier 24 multiplies the M data by the output data of the subtracter 23 (step S604). Next, the shifter 25 shifts the output data of the multiplier 24 only by the amount corresponding to the output data of the decoder 21 (step S605). Next, the adder 26 adds the output data of the shifter 25 to the first converted data, which is the output data of the register 22, and outputs them as the gamma-converted data corresponding to the input data (step S606). Thus, the gamma-conversion circuit 50 can output the output data (the gamma-converted data) corresponding to the input data.

Figure 25:
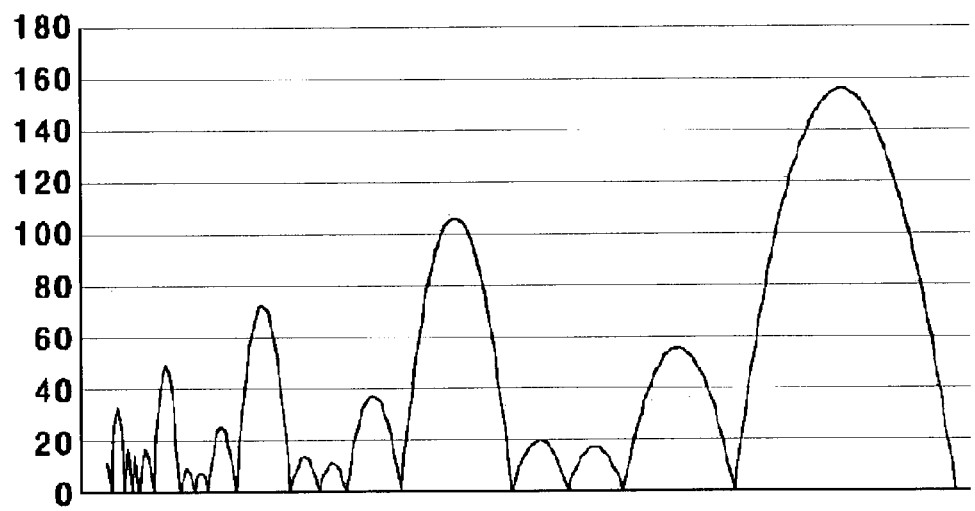
FIG. 25 shows trends of the output data of the gamma-conversion circuit related to the third embodiment of the present invention.
Figure 26:
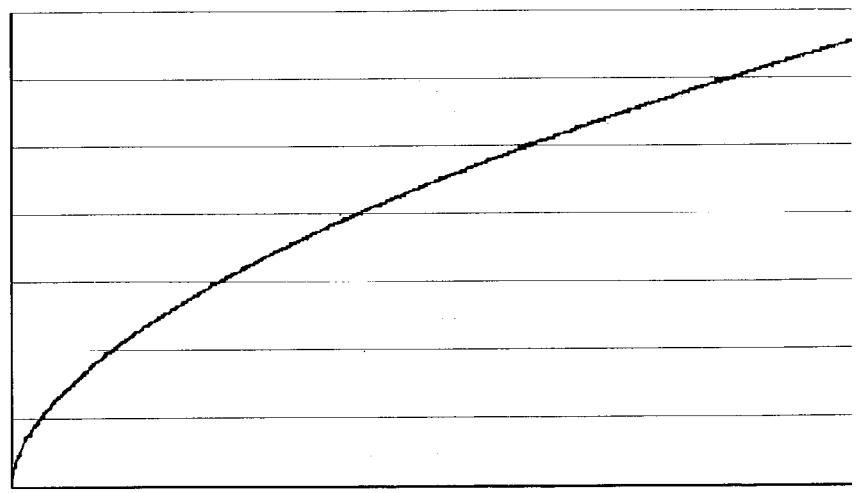
FIG. 26 shows a graph of gamma conversion.
Figure 27:
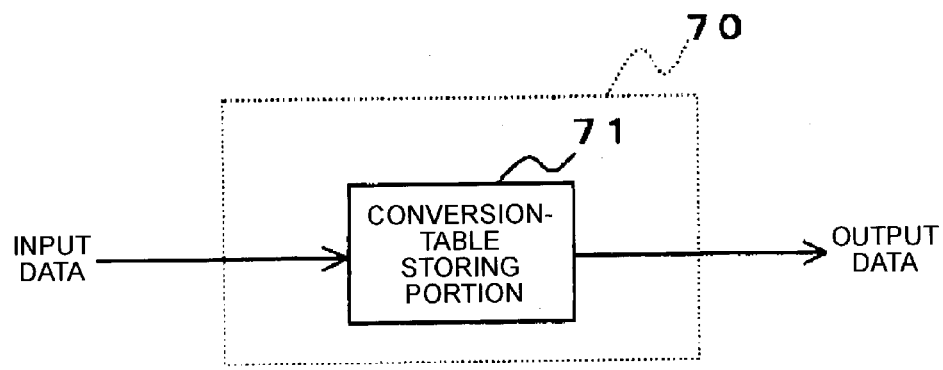
FIG. 27 shows a constitution of a conventional gamma-conversion circuit.
Figure 28:
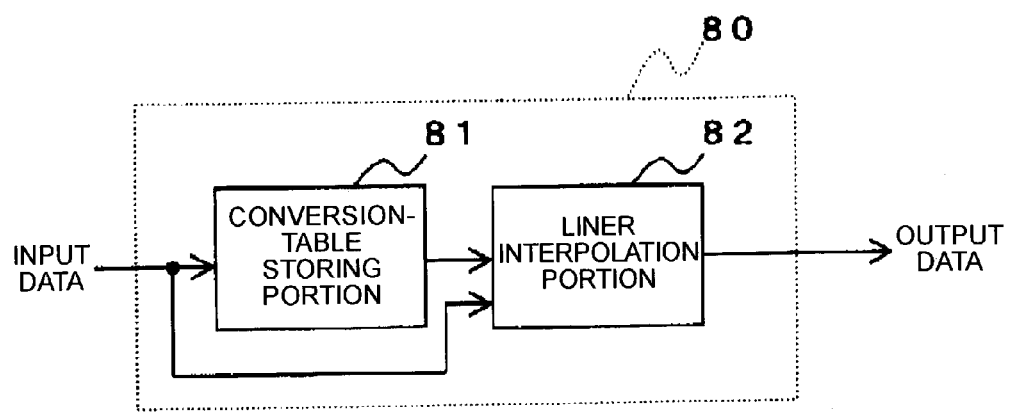
FIG. 28 shows a constitution of a conventional gamma-conversion circuit.

Next, errors between the output data of gamma-conversion circuit 50 and the value calculated by the formula (1) will be described with reference to FIG. 25. FIG. 25 shows a diagram of errors between the output data of the gamma-conversion circuit 50 and the value calculated by the formula (1). As shown in FIG. 25, the maximum error between the output data of gamma-conversion circuit 50 and the value calculated by the formula (1) is about 150.

Hence, according to the present embodiment, the memory capacity of the conversion-table storing portion 55 can be made small.

Here, the gamma-conversion circuit 30 can be composed of a CPU and a program. In such case, a cache memory built-in in a CPU becomes the conversion-table storing portion 55 so that the conversion table can be memorized in a cache memory, since the size of the conversion table is small. Hence, high-speed gamma-conversion can be attained.

In addition, in the present embodiment, the input data have 16-bits width and the output data have 12-bits width, but these data may have other bit widths.

As above mentioned, according to the present invention, the memory capacity of the circuit for storing the converted data can be small and errors in the output data can also be small.

The present invention can provide a method of data conversion, a data conversion circuit and a data conversion program which make the memory capacity of the circuit for storing the converted data small and can make errors in the output data small so that it is useful in data processing.

The present invention can be utilized for an image processing device and a speech-processing unit for a camera, a scanner and others.

What is claimed is:

1. A data conversion method for generating output data by converting input data to decrease memory storage of a circuit for storing converted data, comprising the steps of: a step (a) of obtaining first data of m-bits width, which indicates bit number L corresponding to a position of a pre-selected "1" bit located within the input data; a step (b) of obtaining second data of n-bits width from bit numbers (L-1) to (L-n); a step (c) of generating a first address of (m+n)-bits width by combining the first data with the second data; a step (d) of generating a second address by incrementing or decrementing the first address; a step (e) of reading a first converted data corresponding to the first address and a second converted data corresponding to the second address by a memory means storing converted data, obtained by predetermined-converting the input data, corresponding to the address generated from the input data; and a step (f) of generating the output data based on the first and the second converted data and at least one of storing the output data in the memory means and outputting the output data to a data output line.

2. The data conversion method of claim 1, wherein the step (f) further comprises a step for generating output data by interpolation-processing based on the first and the second converted data.

3. The data conversion method of claim 1, wherein n further comprises two, three or four.

4. The data conversion method of claim 2 wherein the interpolation-processing further comprises a linear interpolation.

5. The data conversion method of claim 1, wherein the predetermined conversion further comprises a gamma conversion.

6. A data conversion method for generating output data by converting input data to decrease memory storage of a circuit for storing converted data, comprising the steps of: a step (a) of obtaining first data of m-bits width, which indicates bit number L corresponding to a position of a pre-selected "1" bit located within the input data; a step (b) of extracting second data of n-bits width from bit numbers (L-1) to (L-n) within the input data, and obtaining third data of k-bits width by predetermined-processing the second data; a step (c) of generating a first address of (m+k) bits width by combining the first data with the third data; a step (d) of generating a second address by incrementing or decrementing the first address; a step (e) of reading a first converted data corresponding to the first address and a second converted data corresponding to the second address by a memory means storing converted data, obtained via the predetermined-converted input data, corresponding to the address generated from the input data; and a step (f) of generating the output data based on the first and the second converted data and at least one of storing the output data in the memory means and outputting the output data to a data output line.

7. The data conversion method of claim 6, wherein the step (f) further comprises a step for generating output data by interpolation-processing based on the first and the second converted data.

8. The data conversion method of claim 7 wherein the interpolation-processing further comprises a linear interpolation.

9. The data conversion method of claim 6, wherein the third data is obtained by dividing the second data of 0 to $(2^n-1)$ into N groups so that the numbers of data in step (b) become $V_0 < V_1 < \ldots < V_N$ when a number of the data belonging to the i group is $V_i$.

10. The data conversion method of claim 6, wherein n further comprises three, four or five.

11. The data conversion method of claim 6, wherein the predetermined conversion further comprises a gamma conversion.

12. A data conversion method for generating output data by converting input data to decrease memory storage of a circuit for storing converted data, comprising the steps of: a step (a) of obtaining first data of m-bits width, which indicates bit number L corresponding to a position of a pre-selected "1" bit located within the input data; a step (b) of extracting second data of n-bits width from a bit number (L-1) to (L-n) within the input data, and obtaining third data of k-bits width, which indicates a bit number corresponding to a position of a pre-selected "1" bit located within the second data; a step (c) of generating a first address of a (m+k) bits width by combining the first data with the third data; a step (d) of generating a second address by incrementing or decrementing the first address, a step (e) of reading first converted data corresponding to the first address and second converted data corresponding to the second address by a memory means storing converted data, obtained by predetermined-converting the input data, corresponding to the address generated from the input data; and a step (f) of generating the output data based on the first and the second converted data and at least one of storing the output data in the memory means and outputting the output data to a data output line.

13. The data conversion method of claim 12, wherein the step (f) includes a step of generating output data by interpolation-processing based on the first and the second converted data.

14. The data conversion method of claim 13 wherein the interpolation-processing further comprises a linear interpolation.

15. The data conversion method according to claim 12, wherein n further comprises 3.

16. The data conversion method of claim 12, wherein the predetermined conversion further comprises a gamma conversion.

17. The data conversion method of claim 16, further comprising the steps of:

a step (g) of disassembling the input data into two sections in order to express data having the same bit numbers as that of the input data in the form of $2^A$ B by using natural numbers A and real numbers B;

a step (h) of reading two converted data, of which one corresponds to each of the two sections, from a table storing a plurality of converted data obtained by predetermined-converting a plurality of data which have equivalent periods; and a step (i) of obtaining converted data expressed as the form of $2^A$ B by multiplying the two converted data;

wherein the converted data which is stored in the memory means is obtained by repeating steps (g) to (i) for a plurality of data.

18. A data conversion circuit to decrease memory storage of the circuit for storing converted data comprising: first means for obtaining first data of m-bits width, which indicates a bit number L corresponding to a position of a pre-selected "1" bit located within the input data; second means for obtaining second data of n-bits width, which follows data of the bit number L in the input data; third means for generating a first address of a (m+n) bits width by combining the first data with the second data, and generating a second address by incrementing or decrementing the first address; fourth means for storing converted data, obtained by predetermined-converting the input data, corresponding to the address generated from the input data; fifth means for reading first converted data, corresponding to the first address generated by the third means, and second converted data, corresponding to the second address generated by the third means, from the fourth means; and sixth means for generating the output data based on the first and the second converted data and at least one of storing the output data in the memory means and outputting the output data to a data output line.

19. The data conversion method of claim 18, wherein the sixth means includes a means for generating output data by interpolation-processing based on the first and the second converted data.

20. The data conversion circuit of claim 18, wherein the predetermined conversion further comprises a gamma conversion.

21. A data conversion circuit to decrease memory storage of the circuit for storing converted data comprising: first means for obtaining first data of m-bits width, which indicates a bit number L corresponding to a position of a pre-selected "1" bit located within the input data; second means for extracting second data of n-bits width from bit numbers (L-1) to (L-n) within the input data, and obtaining third data of a k-bits width by predetermined-processing the second data; third means for generating a first address of (m+k) bits width by combining the first data with the third data, and generating a second address by incrementing or decrementing the first address, fourth means for storing the converted data, obtained by predetermined-converting the input data, corresponding to the address generated from the input data; fifth means for reading a first converted data corresponding to the first address attd a second converted data corresponding to the second address by the fourth means and sixth means for generating the output data based on the first and the second converted data and at least one of storing the output data in the memory means and outputting the output data to a data output line.

22. The data conversion circuit of claim 21, wherein the sixth means further comprises means for generating output data by interpolation-processing based on the first and the second converted data.

23. The data conversion circuit of claim 22, wherein the interpolation-processing further comprises a linear interpolation.

24. The data conversion circuit of claim 21, wherein the second means obtains the third data by dividing the second data of 0 to ($2^n$-1) into N groups so that the numbers of data in the second means become $V_0 < V_1 < \ldots < V_N$ when the numbers of the data belonging to the i group are $V_i$.

25. The data conversion circuit of claim 21, wherein the predetermined conversion further comprises a gamma conversion.

26. A data conversion circuit to decrease memory storage of the circuit for storing converted data comprising: first means for obtaining first data of m-bits width, which indicates a bit number L corresponding to a position of a pre-selected "1" bit located within the input data; second means for extracting second data of n-bits width from a bit number (L-1) to (L-n) within the input data, and obtaining third data of a k-bits width, which indicates a bit number corresponding to a position of a pre-selected "1" bit located within "1" in the second data; third means for generating a first address of (m+k)-bits width by combining the first data with the third data, and generating a second address by incrementing or decrementing the first address, fourth means for storing converted data, obtained by predetermined-converting the input data, corresponding to the address generated from the input data; fifth means for reading a first converted data corresponding to the first address and a second converted data corresponding to the second address by the fourth means, and sixth means for generating the output data based on the first and the second converted data and at least one of storing the output data in the memory means and outputting the output data to a data output line.

27. The data conversion circuit of claim 26, wherein the sixth means further comprises means for generating output data by interpolation-processing based on the first and the second converted data.

28. The data conversion circuit of claim 27, wherein the interpolation-processing further comprises a linear interpolation.

29. The data conversion circuit of claim 26, wherein the predetermined conversion further comprises a gamma conversion.

30. A computer-readable medium having computer-executable instructions for performing a program of data conversion to decrease memory storage of a circuit for storing converted data comprising, the computer-executable instructions comprising the steps of: a step (a) of obtaining first data of m-bits width, which indicates bit number L corresponding to a position of a pre-selected "1" bit located within the input data; a step (b) of obtaining second data of a n-bits width, following the data of bit number L in the input data; a step (c) generating a first address of a (m+n)-bits width by combining the first data with the second data; a step (d) generating a second address by incrementing or decrementing the first address, a step (e) reading a first converted data corresponding to the first address and a second converted data corresponding to the second address by a memory means storing converted data, obtained by predetermined-converting the input data, corresponding to the address generated from the input data; and a step (f) generating the output data based on the first and the second converted data and at least one of storing the output data in the memory means and outputting the output data to a data output line.

31. The computer-readable medium having computer-executable instructions of claim 30, wherein the step (f)

further comprises generating output data by interpolation-processing based on the first and the second converted data.

32. A computer-readable medium having computer-executable instructions for performing a program of data conversion to decrease memory storage of a circuit for storing converted data, the computer-executable instructions comprising the steps of: a step (a) of obtaining first data of m-bits width, which indicates bit number L corresponding to a position of a pre-selected "1" bit located within the input data; a step (b) of extracting second data of a n-bits width from bit numbers (L-1) to (L-n) within the input data, and obtaining third data of a k-bits width by predetermined-processing the second data; a step (c) of generating a first address of a (m+k)-bits width by combining the first data with the third data; a step (d) generating a second address by incrementing or decrementing the first address a step (e) reading a first converted data corresponding to the first address and a second converted data corresponding to the second address by a memory means storing converted data, obtained by predetermined-converting input data, corresponding to the address generated from the input data; and a step (f) generating the output data based on the first and the second converted data and at least one of storing the output data in the memory means and outputting the output data to a data output line.

33. The computer-readable medium having computer-executable instructions of claim 32, wherein step (f) further comprises generating output data by interpolation-processing based on the first and the second converted data.

34. The computer-readable medium having computer-executable instructions of claim 32, wherein step (b) further comprises obtaining the third data by the dividing second data of 0 to ($2^n-1$) into N groups in order that the numbers of data become $V_0 < V_1 < \ldots < V_N$ when the numbers of the data belonging to the i group are $V_i$.

35. A computer-readable medium having computer-executable instructions for performing a program of data conversion to decrease memory storage of a circuit for storing converted data, the computer-executable instructions comprising the steps of: a step (a) of obtaining first data of m-bits width, which indicates bit number L corresponding to a position of a pre-selected "1" bit located within the input data; a step (b) of extracting second data of a n-bits width from bit numbers (L-1) to (L-n) within the input data, and obtaining third data of a k-bits width, which indicates a bit number corresponding to a position of a pre-selected "1" bit located within the second data; a step (c) generating a first address of a (m+k)-bits width by combining the first data with the third data; a step (d) generating a second address by incrementing or decrementing the first address a step (e) reading first converted data corresponding to the first address and second converted data corresponding to the second address by a memory means storing converted data obtained by predetermined-converting the input data, corresponding to the address generated from the input data; and a step (f) generating the output data based on the first and the second converted data and at least one of storing the output data in the memory means and outputting the output data to a data output line.

36. The computer-readable medium having computer-executable instructions of claim 33, wherein the interpolation-processing is a linear interpolation.

37. The computer-readable medium having computer-executable instructions of claim 30, wherein the predetermined-conversion is gamma conversion.

38. The computer-readable medium having computer-executable instructions of claim 32, wherein the predetermined-conversion is gamma conversion.

39. The computer-readable medium having computer-executable instructions of claim 35, wherein the predetermined-conversion is gamma conversion.

40. The computer-readable medium having computer-executable instructions of claim 39, the computer-executable instructions comprising further steps of:
   a step (g) of disassembling the input data into two sections in order to express data having the same bit numbers as that of the input data in the form of $2^A$ B by using natural numbers A and real numbers B;
   a step (h) of reading two converted data, of which one corresponds to each of the two sections, from a table storing a plurality of converted data obtained by predetermined-converting a plurality of data which have equivalent periods; and
   a step (i) of obtaining converted data expressed as the form of $2^A$ B by multiplying the two converted data; wherein the converted data which is stored in the memory means is obtained by repeating steps (g) to (i) for a plurality of data.

* * * * *

UNITED STATES PATENT AND TRADEMARK OFFICE
CERTIFICATE OF CORRECTION

PATENT NO. : 7,111,028 B2 Page 1 of 1
APPLICATION NO. : 10/291173
DATED : September 19, 2006
INVENTOR(S) : Hisao Sato It is certified that error appears in the above-identified patent and that said Letters Patent is hereby corrected as shown below:

| | |
|---|---|
| Col. 1, Line 65 | After "ward", insert --=--. |
| Col. 2, Line 44 | After "corresponding", insert --to--. |
| Col. 3, Line 67 | "comprises" should be --comprise--. |
| Col. 5, Line 65 | "data,;" should be --data;--. |
| Col. 7, Line 10 | "16 'h0009" should be --16' h0009--. |
| Col. 9, Line 50 | "6 'b001100" should be --6' b001100--. |
| Col. 10, Line 9 | "repsectively" should be --respectively--. |
| Col. 10, Line 16 | "16'h0800" should be --16' h0800--. |
| Col. 11, Line 5 | "repose" should be --response--. |
| Col. 13, Line 31 | After "can", insert --be--. |
| Col. 13, Line 65 | "follwing" should be --following--. |
| Col. 14, Line 2 | "$(x_9, x_8, x_7,0,0,0,0,0,0,0,0,0,0,0,0)$" should be --$(x_9, x_8, x_7, 0,0,0,0,0,0,0,0,0,0,0,0)$-- |
| Col. 14, Line 18 | "$(1,1,1,0,0,0,0,0,0,0,0,0,0,0,0)$" should be --$(1,1,1,0,0,0,0,0,0,0,0,0,0,0,0)$--. |
| Col. 15, Line 63 | "xi" should be --$x_i$--. |
| Col. 17, Line 38 | "xi" should be --$x_i$--. |
| Col. 19, Line 30 | "$y_{0003}$" should be --$y_{000a}$--. |
| Col. 20, Line 3 | "b111" should be --b11--. |
| Col. 23, Line 1 | "$2^A$" should be --$2^{-A}$-- |
| Col. 23, Line 10 | "$2^A$" should be --$2^{-A}$-- |
| Col. 23, Line 58 | "attd" should be --and--. |
| Col. 26, Line 5 | After "address", insert --;--. |

Signed and Sealed this

Fourth Day of September, 2007

JON W. DUDAS
*Director of the United States Patent and Trademark Office*